(12) United States Patent
Lanting

(10) Patent No.: US 11,423,115 B2
(45) Date of Patent: Aug. 23, 2022

(54) SYSTEMS AND METHODS FOR REMOVING UNWANTED INTERACTIONS IN QUANTUM DEVICES

(71) Applicant: D-WAVE SYSTEMS INC., Burnaby (CA)

(72) Inventor: Trevor Michael Lanting, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 17/007,395

(22) Filed: Aug. 31, 2020

(65) Prior Publication Data

US 2020/0401649 A1 Dec. 24, 2020

Related U.S. Application Data

(60) Continuation of application No. 16/673,478, filed on Nov. 4, 2019, now Pat. No. 10,789,329, which is a
(Continued)

(51) Int. Cl.
*G06F 17/00* (2019.01)
*G06F 15/82* (2006.01)
*G06N 10/00* (2022.01)

(52) U.S. Cl.
CPC ............ *G06F 17/00* (2013.01); *G06F 15/82* (2013.01); *G06N 10/00* (2019.01)

(58) Field of Classification Search
CPC ............................ G06N 99/002; G06F 15/82
See application file for complete search history.

(56) References Cited

U.S. PATENT DOCUMENTS

| | | |
|---|---|---|
| 4,280,095 A | 7/1981 | Hinton |
| 4,370,359 A | 1/1983 | Fetter et al. |
| | (Continued) | |

FOREIGN PATENT DOCUMENTS

| | | |
|---|---|---|
| CA | 2386426 A1 | 5/2001 |
| CA | 2814865 A1 | 5/2012 |
| | (Continued) | |

OTHER PUBLICATIONS

Bocko et al., "Prospects for Quantum Coherent Computation Using Superconducting Electronics," IEEE Transactions on Applied Superconductivity 7(2):3638-3641, Jun. 1997.
(Continued)

*Primary Examiner* — Feifei Yeung Lopez
(74) *Attorney, Agent, or Firm* — Cozen O'Connor

(57) ABSTRACT

Systems, devices, articles, methods, and techniques for advancing quantum computing by removing unwanted interactions in one or more quantum processor. One approach includes creating an updated plurality of programmable parameters based at least in part on a received value for the characteristic magnetic susceptibility of the qubit in the at least one quantum processor, and returning the updated plurality of programmable parameters. Examples programmable parameters include local biases, and coupling values characterizing the problem Hamilton. Also, for example, a quantum processor may be summarized as including a first loop of superconducting material, a first compound Josephson junction interrupting the first loop of superconducting material, a first coupler inductively coupled to the first loop of superconducting material, a second coupler inductively coupled to the first loop of superconducting material, and a second loop of superconducting material proximally placed to the first loop of superconducting material inductively coupled to the first coupler and the second coupler.

22 Claims, 9 Drawing Sheets

Related U.S. Application Data continuation of application No. 15/984,074, filed on May 18, 2018, now Pat. No. 10,489,477, which is a division of application No. 14/643,180, filed on Mar. 10, 2015, now Pat. No. 10,002,107.

(60) Provisional application No. 61/951,708, filed on Mar. 12, 2014.

(56) References Cited

U.S. PATENT DOCUMENTS

| | | | |
|---|---|---|---|
| 4,371,796 A | 2/1983 | Takada | |
| 4,496,854 A | 1/1985 | Chi et al. | |
| 5,095,357 A | 3/1992 | Andoh et al. | |
| 5,157,466 A | 10/1992 | Char et al. | |
| 5,323,344 A | 6/1994 | Katayama et al. | |
| 5,465,049 A | 11/1995 | Matsuura et al. | |
| 5,523,914 A | 6/1996 | Weck et al. | |
| 5,917,322 A | 6/1999 | Gershenfeld et al. | |
| 5,962,781 A | 10/1999 | Veryaskin | |
| 6,037,649 A | 3/2000 | Liou | |
| 6,058,127 A | 5/2000 | Joannopoulos et al. | |
| 6,389,197 B1 | 5/2002 | Iltchenko et al. | |
| 6,437,413 B1 | 8/2002 | Yamaguchi et al. | |
| 6,459,097 B1 | 10/2002 | Zagoskin | |
| 6,495,854 B1 | 12/2002 | Newns et al. | |
| 6,504,172 B2 | 1/2003 | Zagoskin et al. | |
| 6,563,311 B2 | 5/2003 | Zagoskin | |
| 6,597,010 B2 | 7/2003 | Eriksson et al. | |
| 6,605,822 B1 | 8/2003 | Blais et al. | |
| 6,627,915 B1 | 9/2003 | Ustinov et al. | |
| 6,627,916 B2 | 9/2003 | Amin et al. | |
| 6,670,630 B2 | 12/2003 | Blais et al. | |
| 6,753,546 B2 | 6/2004 | Tzalenchuk et al. | |
| 6,784,451 B2 | 8/2004 | Amin et al. | |
| 6,791,109 B2 | 9/2004 | Tzalenchuk et al. | |
| 6,803,599 B2 | 10/2004 | Amin et al. | |
| 6,822,255 B2 | 11/2004 | Tzalenchuk et al. | |
| 6,838,694 B2 | 1/2005 | Esteve et al. | |
| 6,885,325 B2 | 4/2005 | Omelyanchouk et al. | |
| 6,897,468 B2 | 5/2005 | Blais et al. | |
| 6,936,841 B2 | 8/2005 | Amin et al. | |
| 6,960,780 B2 | 11/2005 | Blais et al. | |
| 6,979,836 B2 | 12/2005 | Zagoskin et al. | |
| 6,984,846 B2 | 1/2006 | Newns et al. | |
| 6,987,282 B2 | 1/2006 | Amin et al. | |
| 6,996,504 B2 | 2/2006 | Novotny et al. | |
| 7,002,174 B2 | 2/2006 | Il et al. | |
| 7,015,499 B1 | 3/2006 | Zagoskin | |
| 7,109,593 B2 | 9/2006 | Freedman et al. | |
| 7,135,701 B2 | 11/2006 | Amin et al. | |
| 7,253,654 B2 | 8/2007 | Amin | |
| 7,277,872 B2 | 10/2007 | Raussendorf et al. | |
| 7,335,909 B2 | 2/2008 | Amin et al. | |
| 7,364,923 B2 | 4/2008 | Lidar et al. | |
| 7,418,283 B2 | 8/2008 | Amin | |
| 7,533,068 B2 | 5/2009 | Maassen et al. | |
| 7,605,600 B2 | 10/2009 | Harris | |
| 7,619,437 B2 | 11/2009 | Thom et al. | |
| 7,639,035 B2 | 12/2009 | Berkley | |
| 7,788,192 B2 | 8/2010 | Amin | |
| 7,800,395 B2 | 9/2010 | Johnson et al. | |
| 7,843,209 B2 | 11/2010 | Berkley | |
| 7,847,615 B2 | 12/2010 | Yorozu et al. | |
| 7,876,248 B2 | 1/2011 | Berkley et al. | |
| 7,880,529 B2 | 2/2011 | Amin | |
| 7,898,282 B2 | 3/2011 | Harris et al. | |
| 8,008,942 B2 | 8/2011 | Van et al. | |
| 8,018,244 B2 | 9/2011 | Berkley | |
| 8,022,722 B1 | 9/2011 | Pesetski et al. | |
| 8,035,540 B2 | 10/2011 | Berkley et al. | |
| 8,063,657 B2 | 11/2011 | Rose | |
| 8,073,808 B2 | 12/2011 | Rose | |
| 8,098,179 B2 | 1/2012 | Bunyk et al. | |
| 8,164,082 B2 | 4/2012 | Friesen | |
| 8,169,231 B2 | 5/2012 | Berkley | |
| 8,174,305 B2 | 5/2012 | Harris | |
| 8,190,548 B2 | 5/2012 | Choi | |
| 8,190,553 B2 | 5/2012 | Routt | |
| 8,195,596 B2 | 6/2012 | Rose et al. | |
| 8,234,103 B2 | 7/2012 | Biamonte et al. | |
| 8,283,943 B2 | 10/2012 | Van Den Brink et al. | |
| 8,421,053 B2 | 4/2013 | Bunyk et al. | |
| 8,504,497 B2 | 8/2013 | Amin | |
| 8,536,566 B2 | 9/2013 | Johansson et al. | |
| 8,686,751 B2 | 4/2014 | Van Den Brink et al. | |
| 8,772,759 B2 | 7/2014 | Bunyk et al. | |
| 8,786,476 B2 | 7/2014 | Bunyk et al. | |
| 8,854,074 B2 | 10/2014 | Berkley | |
| 9,015,215 B2 | 4/2015 | Berkley et al. | |
| 9,059,674 B2 | 6/2015 | Chow et al. | |
| 9,069,928 B2 | 6/2015 | Van Den Brink et al. | |
| 9,129,224 B2 | 9/2015 | Lanting et al. | |
| 9,162,881 B2 | 10/2015 | Biamonte et al. | |
| 9,806,711 B1 | 10/2017 | Abdo | |
| 10,074,792 B1 | 9/2018 | Ferguson et al. | |
| 2002/0117656 A1 | 8/2002 | Amin et al. | |
| 2002/0121636 A1 | 9/2002 | Amin et al. | |
| 2002/0188578 A1 | 12/2002 | Amin et al. | |
| 2002/0190381 A1 | 12/2002 | Herr et al. | |
| 2003/0027724 A1 | 2/2003 | Rose et al. | |
| 2003/0055513 A1 | 3/2003 | Raussendorf et al. | |
| 2003/0071258 A1 | 4/2003 | Zagoskin et al. | |
| 2003/0107033 A1 | 6/2003 | Tzalenchuk et al. | |
| 2003/0121028 A1 | 6/2003 | Coury et al. | |
| 2003/0169041 A1 | 9/2003 | Coury et al. | |
| 2003/0173498 A1 | 9/2003 | Blais et al. | |
| 2003/0224753 A1 | 12/2003 | Bremond et al. | |
| 2004/0000666 A1 | 1/2004 | Lidar et al. | |
| 2004/0012407 A1 | 1/2004 | Amin et al. | |
| 2004/0016918 A1 | 1/2004 | Amin et al. | |
| 2004/0077503 A1 | 4/2004 | Blais et al. | |
| 2004/0078421 A1 | 4/2004 | Routt | |
| 2004/0119061 A1 | 6/2004 | Wu et al. | |
| 2004/0140537 A1 | 7/2004 | Il et al. | |
| 2004/0173792 A1 | 9/2004 | Blais et al. | |
| 2004/0238813 A1 | 12/2004 | Lidar et al. | |
| 2005/0001209 A1 | 1/2005 | Hilton et al. | |
| 2005/0062072 A1 | 3/2005 | Yamamoto et al. | |
| 2005/0082519 A1 | 4/2005 | Amin et al. | |
| 2005/0127915 A1 | 6/2005 | Schauwecker et al. | |
| 2005/0140019 A1 | 6/2005 | Watanabe | |
| 2005/0224784 A1 | 10/2005 | Amin et al. | |
| 2005/0250651 A1 | 11/2005 | Amin et al. | |
| 2005/0256007 A1 | 11/2005 | Amin et al. | |
| 2006/0043541 A1 | 3/2006 | Tetelbaum | |
| 2006/0097746 A1 | 5/2006 | Amin | |
| 2006/0097747 A1 | 5/2006 | Amin | |
| 2006/0147154 A1 | 7/2006 | Thom et al. | |
| 2006/0225165 A1 | 10/2006 | Maassen et al. | |
| 2007/0180586 A1 | 8/2007 | Amin | |
| 2007/0212889 A1 | 9/2007 | Abatchev et al. | |
| 2008/0052055 A1 | 2/2008 | Rose et al. | |
| 2008/0176750 A1 | 7/2008 | Rose et al. | |
| 2008/0238531 A1 | 10/2008 | Harris | |
| 2008/0258753 A1 | 10/2008 | Harris | |
| 2009/0070402 A1 | 3/2009 | Rose et al. | |
| 2009/0078932 A1 | 3/2009 | Amin | |
| 2009/0121215 A1 | 5/2009 | Choi | |
| 2009/0153180 A1 | 6/2009 | Herr | |
| 2010/0182039 A1 | 7/2010 | Baumgardner et al. | |
| 2011/0057169 A1 | 3/2011 | Harris et al. | |
| 2011/0060780 A1* | 3/2011 | Berkley | G06N 10/00 708/207 |
| 2012/0278057 A1 | 11/2012 | Biamonte et al. | |
| 2013/0005580 A1 | 1/2013 | Bunyk et al. | |
| 2013/0278283 A1 | 10/2013 | Berkley | |
| 2014/0097405 A1 | 4/2014 | Bunyk | |
| 2014/0266406 A1 | 9/2014 | Abraham et al. | |
| 2014/0337612 A1 | 11/2014 | Williams | |
| 2015/0032991 A1 | 1/2015 | Lanting et al. | |
| 2015/0032994 A1 | 1/2015 | Chudak et al. | |
| 2015/0046681 A1 | 2/2015 | King | |
| 2016/0267032 A1 | 9/2016 | Rigetti et al. | |

(56) References Cited

U.S. PATENT DOCUMENTS

| | | |
|---|---|---|
| 2016/0314407 A1 | 10/2016 | Bunyk et al. |
| 2016/0335558 A1 | 11/2016 | Bunyk et al. |
| 2017/0344898 A1 | 11/2017 | Karimi et al. |
| 2019/0019099 A1 | 1/2019 | Hoskinson et al. |

FOREIGN PATENT DOCUMENTS

| | | |
|---|---|---|
| JP | 2005142348 A | 6/2005 |
| JP | 2007250771 A | 9/2007 |
| JP | 2009065017 A | 3/2009 |
| JP | 2010524064 A | 7/2010 |
| JP | 2011524043 A | 8/2011 |
| JP | 2011197875 A | 10/2011 |
| JP | 2012064974 A | 3/2012 |
| JP | 6140679 B2 | 5/2017 |
| JP | 2020524064 A | 8/2020 |
| WO | 2002027653 | 4/2002 |
| WO | 2004077600 A1 | 9/2004 |
| WO | 2004102470 A2 | 11/2004 |
| WO | 2005093649 A1 | 10/2005 |
| WO | 2006024939 A2 | 3/2006 |
| WO | 2009120638 A2 | 10/2009 |
| WO | 2012064974 A2 | 5/2012 |
| WO | 2014197001 A1 | 12/2014 |
| WO | 2015103372 A1 | 7/2015 |

OTHER PUBLICATIONS

Clarke et al., "Superconducting quantum bits," Nature 453:1031-1042, Jun. 19, 2008.

Devoret et al., "Superconducting Circuits for Quantum Information: An Outlook," Science 339:1169-1174, Mar. 8, 2013.

Devoret et al., "Superconducting Qubits: A Short Review," arXiv:cond-mat/0411174v1, Nov. 7, 2004, 41 pages.

Friedman et al., "Quantum superposition of distinct macroscopic states," Nature 406:43-46, Jul. 6, 2000.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Lanting, "Systems and Methods for Removing Couplings Between Quantum Devices," U.S. Appl. No. 61/951,708, filed Mar. 12, 2014, 38 pages.

Makhlin et al., "Quantum-state engineering with Josephson-junction devices," Reviews of Modern Physics 73 (2):357-400, Apr. 2001.

Martinis, "Superconducting phase qubits," Quantum Inf Process 8:81-103, 2009.

Mooij et al., "Josephson Persistent-Current Qubit," Science 285:1036-1039, Aug. 13, 1999.

Orlando et al., "Superconducting persistent-current qubit," Physical Review B 60(22):15398-15413, Dec. 1, 1999.

Zagoskin et al., "Superconducting Qubits," La Physique au Canada 63(4):215-227, 2007.

Braunstein et al., "Scalable Quantum Computers", Wiley-VCH Verlag GmbH, Berlin (2001) pp. 273-284; 285-304; 305-324, 2001.

Cormen et al., Introduction to Algorithms, The MIT Press, Cambridge, Massachusetts, pp. 964-985, 2000.

DiVincenzo, "The Physical Implementation of Quantum Computation," Fortschr. Phys. 48:771-783, 2000.

Dolan, "Offset masks for lift—off photoprocessing", Applied Physics Letters, Aug. 26, 2008. https://aip.scitation.org/doi/10.1063/1.89690.

European Search Report, dated Oct. 13, 2010, for EP 05849198.6, 10 pages.

Garey et al., Computers and Intractability: A Guide to the Theory of NP-Completeness, W. H. Freeman and Company, New York, 1979, pp. 1-15.

Han et al., "Time-Resolved Measurement of Dissipation-Induced Decoherence in a Josephson Junction," Science 293:1457-1459, Aug. 24, 2001.

Harris et al., "Probing Noise in Flux Qubits via Macroscopic Resonant Tunneling," arXiv:0712.0838 [cond-mat.mes-hall], 2008, 4 pages.

Hu et al., "Decoherence and dephasing in spin—based solid state quantum computers", arXiv.org:cond—mat/0108339 (2001).

Joyez et al., "Observation of Parity-Induced Suppression of Josephson Tunneling in the Superconducting Single Electron Transistor", hysical Review Letters, 72(15)12458 2461, (1994).

Kim et al., "Coupling of Josephson Current Qubits Using a Connecting Loop," Physical Review B 70:184525-1-184525-6, 2004.

Koval et al., "Narrow Long Josephson Junctions", IEEE, Jun. 1999. https://ieeexplore.ieee.org/document/783894.

Lang, "Analog was not a Computer Trademark!," Sound & Vibration:16-24, Aug. 2000.

Lanting et al., "Geometrical dependence of the low-frequency noise in superconducting flux qubits", Physical Review B, 79, 060509, Jun. 5, 2009, 4 pages.

Lantz et al., "Josephson Junction Qubit Network with Current-Controlled Interaction," Proceedings of the Fourth International Workshop on Macroscopic Quantum Coherence and Computing (MQC2'04), Jun. 7-10, 2004, 13 pages.

Leggett et al., "Dynamics of the dissipative tWo—state system", Reviews of Modern Physics, 59, pp. 1-85, 1987.

Lidar, "On the quantum computational complexity of the Ising spin glass partition function and of knot invariants," New Journal of Physics 6(167): 1-15, 2004.

Koch, et al., "Model for I/f Flux Noise in SQUIDs and Qubits," pp. 1-14, May 5, 2007.

Martinis et al., "Decoherence of a superconducting qubit due to bias noise", Physical Review B, Mar. 25, 2003. https://journals.aps.org/prb/abstract/10.1103/PhysRevB.67.094510.

Martinis et al., "Rabi Oscillations in a Large Josephson-Junction Qubit," Physical Review Letters 89(11):117901-1-117901-4, Sep. 9, 2002.

Murray et al., "Coupling Methods and Architectures for Information Processing,"U.S. Appl. No. 11/247,857, filed Oct. 10, 2005, 73 pages.

Murray et al., "Coupling Schemes for Information Processing," U.S. Appl. No. 60/460,420, filed Dec. 30, 2004, 44 pages.

Nakamura et al., "Coherent control of macroscopic quantum states in a single-Cooper-pair-box," Nature 398:786-788, Apr. 29, 1999.

Niskanen et al., "Quantum Coherent Tunable Coupling of Superconducting Qubits," Science 316:723-726, May 4, 2007.

Paauw et al., "Spectroscopy on Two Coupled Superconducting Flux Qubits", Physical Review Letters, Mar. 9, 2005. https://journals.aps.org/prl/abstract/10.1103/PhysRevLett.94.090501.

Quintana, "Superconducting Flux Qubits for High-Connectivity Quantum Annealing Without Lossy Dielectrics," Doctoral Thesis, UC Santa Barbara, 2017, 413 pages.

Ramos et al., "Design for Effective Thermalization of Junctions for Quantum Coherence," IEEE Transactions on Applied Superconductivity 11(1):998-1001, Mar. 2001.

Levinson, "Principles of Lithography", The International Society for Optical Engineering, Bellingham, WA, 2001. (book details provided).

Rudo, "Influence of Strong Noise on the Adiabatic Quantum Computer," University of Vienna, 2015, 66 pages.

Strauch, Theory of Superconducting Phase Qubits, UMI Microform, Ann Arbor, Michigan, 2005, Chapter 8, "Conclusion," pp. 298-306.

Suzuki et al., "Quantum Annealing of the Random-Field Ising Model Transverse Ferromagnetic Interactions," arXiv:quant-ph/0702214v1, 6 pages, 2007.

Van Dam, "Quantum Computing in the 'Death Zone'?," Nature Physics 3:220-221, 2007.

Van der Ploeg et al., "Controllable Coupling of Superconducting Flux Qubits," Physical Review Letters 98:057004-1-057004-4, 2007.

Van der Wal et al., "Quantum Superposition of Macroscopic Persistent current states", Science 290, pp. 773-777, 2000.

(56) References Cited

OTHER PUBLICATIONS

Vion et al., "Manipulating the quantum state of an electrical circuit", Science, 296, pp. 886-889 (2002).
Wallquist et al., "Superconducting Qubit Network with Controllable Nearest-Neighbor Coupling," New Journal of Physics 7(178), 24 pages, 2005.
Wallraff, "Fluxon dynamics in annular Josephson junctions: from relativistic strings to quantum particles", Friedrich-Alexander University of Erlangen-Nürnberg, Apr. 1, 2001.
Wang et al., "Fast Entanglement of Two Charge-Phase Qubits Through Nonadiabatic Couling to a Large Josephson Junction," Physical Review B 70:224515-1-224515-4, 2004.
Wei et al., "Quantum Computation with Josephson-Qubits by Using a Current-Biased Information Bus," arXiv:cond-mat/0407667 v1, pp. 1-13, Jul. 26, 2004.
Wendin et al., "Superconducting Quantum Circuits, Qubits and Computing," arXiv:cond-mat/0508729, 2005, 60 pages.
Wendin et al., "Superconducting Quantum Circuits, Qubits and Computing," arXiv:cond-mat/0508729v1 [cond-mat.supr-con], Aug. 30, 2005, 60 pages.
Wocjan et al., "Treating the Independent Set Problem by 2D Ising Interactions with Adiabatic Quantum Computing," arXiv:quant-ph/0302027v1, pp. 1-13, Feb. 4, 2003.
Yamamoto et al., "Demonstration of conditional gate operation using superconducting charge qubits", Nature, Oct. 30, 2003. https://www.nature.com/articles/nature02015.
You et al., "Controllable Manipulation and Entanglement of Macroscopic Quantum States in Coupled Charge Qubits," Physical Review B 68:024510-1-024510-8, 2003.
You et al., "Fast Two-Bit Operations in Inductively Coupled Flux Qubits," arXiv:cond-mat/0309491 v1, pp. 1-5, Sep. 22, 2003.
You et al., "Scalable Quantum Computing with Josephson Charge Qubits," Physical Review Letters 89(19):197902-1-197902-4, 2002.
Zagoskin et al., "Quantum Two-Level Systems in Josephson Junctions as Naturally Formed Qubits," Physical Review Letters 97:077001-1-077001-4, 2006.
Zurek, "Decoherence and the transition from quantum to classical", Physics Today, 44, 10, pp. 36-44, 1991.
Shirts, et al., "Computing: Screen Savers of the Word Unite!," Science Online 290(5498): 1903-1904, Dec. 8, 2000.
Van Zant, "Microchip Fabrication", Fourth Edition, McGraw-Hill, New York, 2000. (book details provided).
Niskanen et al., "Quantum Coherent Tunable Coupling of Superconducting Qubits," Science 318:723-726, May 4, 2007.
Van der Ploeg et al., "Controllable Coupling of Superconducting Fiux Qubits," Physical Review Letters 98:057004-1-057004-4, 2007.
Bravyi et al., "The Complexity of Stoquastic Local Hamiltonian Problems," arXiv:quant-ph/0606140v1, pp. 1-21, Jun. 16, 2006.
Choi, "Systems, Devices, and Methods for Analog Processing," U.S. Appl. No. 60/986,554, filed Nov. 8, 2007, 39 pages.
Choi, M-S., "Geometric Quantum Computation on Solid-State Qubits," arXiv:quant-ph/0111019v4, Sep. 29, 2003, 7 pages.
Corato et al., "Adiabatic Quantum Computation with Flux Qbits," Quantum Computing in Solid State Systems, pp. 103-110, 2006.
Cosmelli, C., "Controllable Flux Coupling for the Integration of Flux Qubits," arXiv:cond-mat/0403690v1 [cond-mat.supr-con]. Mar. 29, 2004, 10 pages.
Duty et al., "Coherent Dynamics of a Josephson Charge Qubit," Physical Review B 69(140503(R)):1-4, 2004.
Esteve et al., "Solid State Quantum Bit Circuits," arXiv:cond-mat/0505676 [cond-mat.supr-con], May 27, 2005, 37 pages.
Dolan, et al., "Optimization on the NEOS Server," from SIAM News 35(6): 1-5, Jul./Aug. 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.

Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.
Grajcar et al., "Experimental Realization of Direct Josephson Coupling Between Superconducting Flux Qubits," arXiv:cond-mat/0501085v1, Jan. 5, 2005, 4 pages.
Grajcar et al., "Possible Implementation of Adiabatic Quantum Algorithm with Superconducting Flux Qubits," arXiv:cond-mat/0407405v3 [cond-mat.supr-con], Mar. 29, 2005, 8 pages.
Harris et al., "A Compound Josephson Junction Coupler for Flux Qubits with Minimal Crosstalk," arXiv:0904.37841 [cond-mat.supr-con] Apr. 24, 2009, 4 pages.
Harris et al., "Sign and Magnitude Tunable Coupler for Superconducting Flux Qubits," arXiv:cond-mat/0608253v1 [cond-mat.supr-con], Aug. 11, 2006. 5 pages.
Harris et al., "Probing Noise in Flux Qubits via Macroscopic Resonant Tunneling," arXiv:0712.0838v2 [cond-mat.mes-hall], Feb. 8, 2008, 4 pages.
Harris, "Systems, Devices, and Methods for Controllably Coupling Qubits," U.S. Appl. No. 12/017,995, filed Jan. 22, 2008, 33 pages.
Harris, "Systems, Methods and Apparatus for Anti-Symmetric Qubit-Coupling," U.S. Appl. No. 12/098,347, filed Apr. 4, 2008, 33 pages.
He et al., "Switchable Coupling Between Charge and Flux Qubits," arXiv:cond-mat/0703012v2 [cond-mat.supr-con], 5 pages, 2007.
Hime et al., "Solid-State Qubits with Current-Controlled Coupling," Science 314:1427-1429, 2006.
Hime et al., "Supporting Online Material for Solid-State Qubits with Current-Controlled Coupling," retrieved from http://www.sciencemag.org/cgi/content/full/314/5804/1427/DC1, 5 pages, Dec. 1, 2006.
Hutter et al., "Inductively Coupled Charge Qubits with Asymmetric SQUIDs," Jahrestagung der Deutschen Physikalischen Gesellschaft (DPG), 2005, 1 page—abstract only.
Il'ichev et al., "Continuous Monitoring of Rabi Oscillations in a Josephson Flux Qubit," Physical Review Letters 91(9):097906-1-097906-4, week ending Aug. 29, 2003.
Il'ichev et al., "Radio-Frequency Method for Investigation of Quantum Properties of Superconducting Structures," arXiv:cond-mat/0402559v3, Jun. 23, 2004, 10 pages.
International Search Report and Written Opinion for PCT/US2018/066613, dated Mar. 29, 2019, 24 pages.
Fourer, et al., "Optimization as an Internet Resource," INTERFACES 31(2): 130-150, Mar.-Apr. 2001.
Johnson et al., "Scalable Control System for a Superconducting Adiabatic Quantum Optimization Processor," Superconductor Science & Technology (2010).
Inokuchi, "Analog Computation Using Quantum-Flux Parametron Devices," Physica C 357-360 :1618-1621, 2001.
Kaminsky et al., "Scalable Superconducting Architecture for Adiabatic Quantum Computation," arXiv:quant-ph/0403090v1, Mar. 11, 2004, 5 pages.
Kim, "Controllable Coupling in Phase-Coupled Flux Qubits," Physical Review B 74:184501-1-184501-7, 2006.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Kaiser, et al., "Coherent Atomic Matter Waves: Proceedings of the Les Houches Summer School, Session LXXII in 1999," Springer-Verlag, New York, ISBN 286883499X, pp. 184-188, 294-295, 302-303.
Maassen van den Brink et al., "Mediated tunable coupling of flux qubits," New Journal of Physics 7:1-18, 2005.
Majer et al., "Spectroscopy on Two Coupled Superconducting Flux Qubits," Physical Review Letters 94:090501-1-090501-4, 2005.
Majer, J.B., "Superconducting Quantum Circuits," Thesis, published by DUP Science, Dec. 13, 2002, 120 pages.
Nielsen et al., Quantum Computation and Quantum Information, Cambridge University Press, Cambridge, 2000, "7.8 Other implementation schemes," pp. 343-345.
Niskanen et al., "Tunable Coupling Scheme for Flux Qubits at the Optimal Point," Physical Review B 73:094506-1-094506-8, 2006.
Pashkin et al., "Quantum Oscillations in Two Coupled Charge Qubits," Nature 421:823-826, Feb. 20, 2003.

(56) References Cited

OTHER PUBLICATIONS

Plourde et al., "Entangling Flux Qubits with a Bipolar Dynamic Inductance," arXiv:quant-ph/0406049v1, Jun. 8, 2004, 4 pages.
Rose et al., "Systems, Devices and Methods for Interconnected Processor Topology," U.S. Appl. No. 12/013,192, filed Jan. 11, 2008, 47 pages.
Shor, "Introduction to Quantum Algorithms," AT&T Labs—Research, arXiv:quant-ph/0005003 v2, pp. 1-17, Jul. 6, 2001.
Vala et al., "Encoded Universality for Generalized Anisotropic Exchange Hamiltonians," arXiv:quant-ph/0204016v1, Apr. 4, 2002, 15 pages.
Van der Ploeg, et al., "Adiabatic Quantum Computation with Flux Qubits, First Experimental Results," arXiv:cond-mat/0702580v1 [cond-mat.supr-con], Feb. 25, 2007, 6 pages.
Van der Wal, C.H., "Quantum Superpositions of Persistent Josephson Currents," Thesis, Published by DUP Science, Sep. 24, 2001, 121 pages.
Wallraff et al., "Strong Coupling of a Single Photon to a Superconducting Qubit Using Circuit Quantum Electrodynamics," Nature 431:162-167, Sep. 9, 2004.
Wu et al., "Dressed Qubits," Physical Review Letters 91(9):1-4, Aug. 29, 2003.
Wu et al., "Qubits as Parafermions," arXiv:quant-ph/0109078v3, May 28, 2002, 17 pages.
Wu et al., "Universal Quantum Logic from Zeeman and Anisotropic Exchange Interactions," Physical Review A 66 (062314):1-5, 2002.
"A High-Level Look at Optimization: Past, Present and Future," e-Optimization.Community, May 2000, pp. 1-5.
Carelli et al., "SQUID Systems for Macroscopic Quantum Coherence and Quantum Computing", IEEE trans. Apple. Supercond., Mar. 1, 2001. https://ieeexplore.ieee.org/document/919321.
Chancellor et al., "A Direct Mapping of Max k-SAT and High Order Parity Checks to a Chimera Graph", Nature Magazine, Nov. 8, 2016. https://www.nature.com/articles/srep37107.
Chancellor et al., "Circuit design for multi-body interactions in superconducting quantum annealing systems with applications to a scalable architecture", Nature Magazine, Aug. 1, 2016. https://www.nature.com/articles/s41534-017-0022-6.
Chancellor et al., "Experimental Freezing of mid-Evolution Fluctuations with a Programmable Annealer", arXiv:1605.07549 [quant-ph], May 24, 2016. https://arxiv.org/abs/1605.07549.
Chen et al., "Qubit architecture with high coherences and fast tunable coupling", Physical Review Letters, Feb. 28, 2014. https://arxiv.org/abs/1402.7367.
Choi, "D3-Triad", Sep. 12, 2007.
Dos Santos, R., "Introduction to Quantum Monte Carlo Simulations for Fermionic Systems," arXiv:cond-mat/0303551v1 [cond-mat.str-el], Mar. 26, 2003, 18 pages.
Grajcar et al., "Adiabatic quantum computation with flux qubits, first experimental results", arXiv, Feb. 25, 2007. https://arxiv.org/abs/cond-mat/0702580.
Grajcar et al., "Four-Qubit Device with Mixed Couplings", Physical Review Letters, Oct. 2, 2006. https://journals.aps.org/prl/abstract/10.1103/PhysRevLett.96.047006.
Groszkowski et al., "Tunable coupling between three qubits as a building block for a superconducting quantum computer", arXiv:1102.0307v2 [quant-ph], Oct. 20, 2011. https://arxiv.org/abs/1102.0307.
Gu et al., "Encoding Universal Computation in the Ground States of Ising Lattices", arXiv:1204.1084v2 [cond-mast.stat-mech], Jul. 17, 2012. https://arxiv.org/abs/1204.1084.
Harris et al., "Synchronization of Multiple Coupled rf-SQUID Flux Qubits", arXiv:0903.1884v1, Mar. 11, 2009. https://arxiv.org/abs/0903.1884.
Harris, et al., "Probing Noise in Flux Qubits via Macroscopic Resonant Tunneling," arXiv:0712.0838 [cond-mat.mes-hall], 2008, pp. 1-4.
Hita-Perez et al., "Ultrastrong capacitive coupling of flux qubits", arXiv:2108.02549v1, Aug. 5, 2021. https://arxiv.org/abs/2108.02549.
Hormozi et al., "Nonstoquastic Hamiltonians and Quantum Annealing of an Ising Spin Glass," arXiv:1609.06558v2 [quant-ph], May 15, 2017, 9 pages.
Hua et al., "Microstrip Bandpass Filters Using Dual-Mode Resonators with Internal Coupled Lines," Progress in Electromagnetics Research C, 21:99-111, 2011.
Hutter et al., "Tunable Coupling of qubits: nonadiabatic corrections", arXiv:cond-mat/0602086v2, May 12, 2006. https://arxiv.org/abs/cond-mat/0602086.
Johansson et al., "Landau-Zener Transitions in an Adiabatic Quantum Computer", arXiv:0807.0797v1, Jul. 4, 2008. https://arxiv.org/abs/0807.0797.
Johnson et al., "What are the Least Tractable of Max Independent Set?", AT&T Labs, Oct. 24, 1998. https://dl.acm.org/doi/abs/10.5555/314500.315093?download=true.
Kempe et al., "The Complexity of the Local Hamiltonian Problem", arXiv:quant-ph/0406180, Jun. 24, 2004. https://arxiv.org/abs/quant-ph/0406180.
Kerman et al., "Quantum Enhanced Optimization: Experimental Study Overview", IARPA, Oct. 26, 2015.
Lechner et al., "A quantum annealing architecture with all-to-all connectivity from local interactions", Science Advances. Oct. 23, 2015. https://advances.sciencemag.org/content/1/9/e1500838.
Leib et al., "A Transmon Quantum Annealer: Decomposing Many-Body Ising Constraints Into Pair Interactions", arXiv:1604.02359 [quant-ph], Apr. 8, 2016. https://arxiv.org/abs/1604.02359.
Lykiardopoulou et al., "Improving nonstoquastic quantum annealing with spin-reversal transformations", Arxiv, Sep. 30, 2020.
Maassen van den Brink, "Galvanic coupling of flux qubits simple theory and tunability", Superconductivity (cond-mat.supr-con), May 16, 2006. https://arxiv.org/abs/cond-mat/0605398.
Madou, Fundamentals of Microfabrication, Second Edition, CRC Press LLC, Boca Raton, Florida, 2002. (book details provided).
Neill, "A path towards quantum supremacy with superconducting qubits", PhD Thesis—University of California, Dec. 1, 2017.
Nielsen et al., "7.8 Other implementation schemes", Quantum Computing and Quantum Information, 2000. http://mmrc.amss.cas.cn/tlb/201702/W020170224608149940643.pdf.
Nishimori et al., "Exponential enhancement of the efficiency of quantum annealing by non-stoquastic hamiltonians", arXiv:1609.03785 [quant-ph], Feb. 18, 2017. https://arxiv.org/abs/1609.03785.
Oliveria et al., "The complexity of quantum spin systems on a two-dimensional square lattice", arXiv:quant-ph/0504050, Aug. 1, 2008. https://arxiv.org/abs/quant-ph/0504050.
Perdomo-Ortiz et al., "Opportunities and Challenges for Quantum-Assisted Machine Learning in Near-Term Quantum Computers," arXiv:1708.09757v1 [quant-ph]. Aug. 31, 2017, 14 pages.
Rocchetto et al., "Stabilisers as a design tool for new forms of Lechner-Hauke-Zoller Annealer", arXiv:1603.08554 [quant-ph], May 2, 2016. https://arxiv.org/abs/1603.08554.
Rudo, "Influence of strong noise on the Adiabatic Quantum Computer," University of Vienna, 2015, pp. 1-66.
Schaller et al., "The role of symmetries in adiabatic quantum algorithms", arXiv:0708.1882, Aug. 14, 2007. https://arxiv.org/abs/0708.1882.
Schützhold et al., "Adiabatic quantum algorithms and quantum phase transitions", arXiv:quant-ph/0608017, Aug. 1, 2006. https://arxiv.org/abs/quant-ph/0608017.
Shnirman et al., "Low-and High-Frequency Noise from Coherent two-Level Systems", Physical Review Letters, Apr. 1, 2005. https://arxiv.org/abs/cond-mat/0412668#:~:text=This%20implies%20a%20relation%20between,the%20parameters%20of%20the%20TLSs.
Steffen et al., "Quantum computing: An IBM perspective", IBM Journal of Research and Development, Sep./Oct. 2011.
Tang et al., "2D implementation of quantum annealing algorisms for fourth order binary optimization problems", Institute for Quantum Computing and Department of Electrical and Computer Engineering, May 12, 2016.
Thom et al., "Coupling methods and architectures for information processing", U.S. Appl. No. 11/247,857, filed Oct. 10, 2005. https://patents.google.com/patent/US7619437B2/en?oq=US11%2f247%2c857.

(56) References Cited

OTHER PUBLICATIONS

Tokuda, "Analog Computation Using Single-Electron Circuits", Analog Integrated Circuits and Signal Processing, Oct. 1, 2000.
Vinci et al., "Non-stoquastic interactions in quantum annealing via the aharonov-anandan phase", arXiv:1701.07494 [quant-ph], Jan. 25, 2017.
Weber et al., "Coherent Coupled Qubits for Quantum Annealing," arXiv:1701.06544v2 [quant-ph], Jun. 6, 2017, 14 pages.
Wei et al., "Preparation of multi-qubit W states in multiple resonators coupled by a superconducting qubit via adiabatic passage", Quantum Inf Process, Apr. 14, 2015.
Yan et al., "A tunable coupling scheme for implementing high-fidelity two-qubit gates", Arxiv, Mar. 26, 2018.
Barends, R., et al., "Coherent Josephson qubit suitable for scalable quantum integrated circuits," arXiv:1304.2322v1 [quant-ph], Apr. 8, 2013, 10 pages.
Born, et al., "Fabrication of Ultrasmall Tunnel Junctions by Electron Beam Direct-Writing", IEEE, 2001, 4 pages.
Aaronson, "Thanksgiving Special: D-Wave at MIT," Shtetl-Optimized—The Blog of Scott Aaronson, URL=http://www.scottaaronson.com/blog/?p=291, retrieved Apr. 14, 2011 (originally retrieved Nov. 28, 2007), 54 pages.
Abelson et al., "Superconductor Integrates Circuit Fabrication Technology", IEEE Invited Paper, Oct. 10, 2004. https://ieeexplore.ieee.org/document/1335546.
Albash et al., "Simulated Quantum Annealing with Two All-to-All Connectivity Schemes", arXiv:1603.03755v1 [quant-ph], Mar. 11, 2016. https://arxiv.org/abs/1603.03755.
Almasi et al., "Blue Gene: A vision for protein science using a petaflop supercomputer", IBM Systems Journal, 2001. https://ieeexplore.ieee.org/document/5386970.
Al-Saidi et al., "Several small Josephson junctions in a resonant cavity: Deviation from the Dicke model", Physical Review B, Jun. 5, 2002.
Amin et al., "Decoherence in adiabatic quantum computation", arXiv:0708.0384, Aug. 2, 2007. https://arxiv.org/abs/0708.0384.
Choudhury, "Handbook of Microlithography, Micromachining and Microfabrication vol. 1: Microlithography", The International Society for Optical Engineering, Bellingham, WA, 1999. (book details provided).
Angelakis et al., "Many body effects and cluster state quantum computation in strongly interacting systems of photons," Quantum Information and Many Body Quantum Systems referred proceedings. Scuola Normale Superiore, CRM Series, vol. 5., 2008, pp. 1-10.
Astafiev et al., "Single-Shot Measurement of the Joseph Charge Qubit," Physical Review B 69(180507(R):1-4, 2004.
Averin et al., "Variable Electrostatic Transformer: Controllable Coupling of Two Charge Qubits," Physical Review Letters 91(5): 057003-1-057003-4, Aug. 1, 2003.
Averin, D.V., "Adiabatic Quantum Computation with Cooper Pairs," arXiv:quant-ph/9706026v1, Jun. 13, 1997, 18 pages.
Barenco et al., "Elementary gates for quantum computation," Physical Review A 52(5):3457-3467, Nov. 1995.
Barone et al., Physics and Applications of the Josephson Effect, John Wiley & Sons, 1982, pp. 416-427.
Bartlett et al., "Simple Nearest-Neighbor Two-Body Hamiltonian System for Which the Ground State is a Universal Resource for Quantum Computation," Physical Review A 74:040302-1-040302-4, 2006.
Berggren, "Quantum Computing With Superconductors", Proceedings of the IEEE, Oct. 1, 2004. https://www.researchgate.net/publication/2986358_Quantum_Computing_with_Superconductors.
Berkley et al., "Entangled Macroscopic Quantum States in Two Superconducting Qubits", Science, Jun. 6, 2003. https://science.sciencemag.org/content/300/5625/1548.
Berkley et al., "Systems, Methods and Apparatus for Local Programming of Quantum Processor Elements," U.S. Appl. No. 11/950,276, filed Dec. 4, 2007, 31 pages.
Berkley, "Methods of Ferromagnetic and Adiabatic Classical Qubit State Copying", U.S. Appl. No. 60/675,139, filed Apr. 26, 2005, 45 pages.
Biamonte et al., "Physical Implementations for a Universal Quantum Computer and Related Coupling Devices," U.S. Appl. No. 60/910,445, filed Apr. 5, 2007, 63 pages.
Biamonte et al., "Physical Realizations of a Universal Adiabatic Quantum Computer," Notice of Allowance dated Jun. 18, 2015, for U.S. Appl. No. 13/539,039, 9 pages.
Biamonte et al., "Physical Realizations of a Universal Adiabatic Quantum Computer," Notice of Allowance dated Mar. 28, 2012, for U.S. Appl. No. 12/098,348, 8 pages.
Biamonte et al., "Physical Realizations of a Universal Adiabatic Quantum Computer," Office Action dated Mar. 16, 2012, for U.S. Appl. No. 12/098,348, 6 pages.
Biamonte et al., "Realizable Hamiltonians for Universal Adiabatic Quantum Computers," arXiv:0704.1287v1 [quant-ph], pp. 1-4, Apr. 10, 2007.
Biamonte et al., "Realizable Hamiltonians for Universal Adiabatic Quantum Computers," Physical Review A 78:012352, 2008, pp. 012352-1 through 012352-7.
Blais et al., Cavity Quantum Electrodynamics for Superconducting Electrical Circuits: An Architecture for Quantum Computation, Physical Review A 69(062320):1-14, 2004.
Blais et al., "Operation of universal gates in a solid-state quantum computer based on clean Josephson junctions between d-wave superconductors", Physical Review A, 61, 042308, 2000.
Blais et al., "Tunable Coupling of Superconducting Qubits," arXiv:cond-mat/0207112v3 [cond-mat.mes-hall], Mar. 18, 2003, 4 pages.
Blatter et al., "Design aspects of superconducting-phase quantum bits," Physical Review B 63: 174511-1-174511-9, 2001.
Blatter, G., "The Qubit Duet," Nature 421:796-797, Feb. 20, 2003.
Bryant et al., "Introduction to Electronic Analogue Computing," Physics& Mathematics, AEC Research and Development Report, pp. 2-50, Aug. 1966.
Buisson et al., "Entangled states in a Josephson charge qubit coupled to a superconducting resonator", arXiv.org:cond/mat/0008275 (2000).
Butcher, J.R., "Advances in Persistent-Current Qubit Research: Inductively Coupled Qubits and Novel Biasing Methods," Final Report, Delft University of Technology, Jan. 14, 2002, 52 pages.

* cited by examiner

SYSTEMS AND METHODS FOR REMOVING UNWANTED INTERACTIONS IN QUANTUM DEVICES

BACKGROUND

Field

This disclosure generally relates to devices, and architectures for quantum instruments comprising quantum devices and techniques for operating the same.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f \quad (1)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. In the present systems and devices, an "adiabatic" evolution is an evolution that satisfies the adiabatic condition:

$$\dot{s}|\langle 1|dH_e/ds|0\rangle| = \delta g^2(s) \quad (2)$$

where $\dot{s}$ is the time derivative of s, g(s) is the difference in energy between the ground state and first excited state of the system (also referred to herein as the "gap size") as a function of s, and δ is a coefficient much less than 1. Generally the initial Hamiltonian $H_i$ and the final Hamiltonian $H_f$ do not commute. That is, $[H_i, H_f] \neq 0$.

The process of changing the Hamiltonian in adiabatic quantum computing may be referred to as evolution. If the rate of change, for example, change of s, is slow enough that the system is always in the instantaneous ground state of the evolution Hamiltonian, then transitions at anti-crossings (i.e., when the gap size is smallest) can be avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present in quantum annealing. The final low-energy state may not be the global energy minimum. Adiabatic quantum computation may be considered a special case of quantum annealing for which the system, ideally, begins and remains in its ground state throughout an adiabatic evolution. Examples of an ideal system include those at zero effective temperature and no effective interaction with the environment. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P \quad (3)$$

where A(t) and B(t) are time dependent envelope functions. For example, A(t) changes from a large value to substantially zero during the evolution. The Hamiltonian $H_E$ may be thought of as an evolution Hamiltonian similar to $H_e$ described in the context of adiabatic quantum computation above. The disorder may be removed by removing $H_D$ (i.e., reducing A(t)). The disorder may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of $H_P$ may be crafted so that its global minimum is the answer to the problem to be solved, and low-lying local minima are good approximations.

Superconducting Qubits

There are solid state qubits based on circuits of superconducting materials. There are two superconducting effects that underlie how superconducting qubits operate: magnetic flux quantization, and Josephson tunneling.

Flux is quantized via the Aharonov-Bohm effect where electrical charge carriers accrue a topological phase when traversing a conductive loop threaded by a magnetic flux. For superconducting loops, the charge carriers are pairs of electrons called Cooper pairs. For a loop of sufficiently thick superconducting material, quantum mechanics dictates that the Cooper pairs accrue a phase that is an integer multiple of $2\pi$. This then constrains the allowed flux in the loop. The flux is quantized. The current in the loop is governed by a single wavefunction and, for the wavefunction to be single-valued at any point in the loop, the flux within it is quantized. In other words, superconductivity is not simply the absence of electrical resistance but rather a quantum mechanical effect.

Josephson tunneling is the process by which Cooper pairs cross an interruption, such as an insulating gap of a few nanometres, between two superconducting electrodes. The amount of current is sinusoidally dependent on the phase difference between the two populations of Cooper pairs in the electrodes. That is, the amount of current is dependent on the phase difference across the interruption.

These superconducting effects are present in different configurations and give rise to different types of superconducting qubits including flux, phase, charge, and hybrid qubits. These different types of qubits depend on the topology of the loops, placement of the Josephson junctions, and the physical parameters of the parts of the circuits, such as, inductance, capacitance, and Josephson junction critical current.

Superconducting Quantum Processor

A plurality of superconducting qubits may be included in superconducting quantum processor. A superconducting quantum processor may include a number of qubits and associated local bias devices, for instance two or more superconducting qubits. A superconducting quantum processor may also employ couplers (that is, coupling devices) providing communicative coupling between qubits. A qubit and a coupler resemble each other but differ in physical parameters. One difference is the parameter, $\beta$. Consider an rf-SQUID, superconducting loop interrupted by Josephson junction, $\beta$ is the ratio of the inductance of a Josephson junctions in to the geometrical inductance of the loop. A design with lower values of $\beta$, about 1, behaves more like a simple inductive loop, a monostable device. A design with higher values is more dominated by the Josephson junctions, and is more likely to have bistable behavior. The parameter, $\beta$ is defined a $2\pi L I_C/\Phi_0$. That is, $\beta$ is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Nature of Problem Hamiltonian

The final or problem Hamiltonian $H_P$ has ground state that encodes a solution to the problem the computer can solve. The problem the computer can solves may be slightly different than the problem of interest. This difference can be called a distortion and the problem the computer can solve the distorted problem. The differences can arise because of the physical components of the computer depart from an idealized mathematical description. Recognizing where these differences occur and accounting for the differences are challenges in the art.

BRIEF SUMMARY

A quantum processor may be summarized as including a first loop of superconducting material, that superconducts below a critical temperature, a first compound Josephson junction interrupting the first loop of superconducting material, a first coupler inductively coupled to the first loop of superconducting material, a second coupler inductively coupled to the first loop of superconducting material, and a second loop of superconducting material, that superconducts below a critical temperature, proximally placed to the first loop of superconducting material inductively coupled to the first coupler and inductively coupled to the second coupler. The quantum processor may further include a tunable inductance interrupting the second loop of superconducting material. The quantum processor may further include a global signal line inductively coupled to the second loop of superconducting material.

A computational system may be summarized as including at least one quantum processor comprising: a plurality of qubits, a plurality of couplers, where each coupler provides controllable communicative coupling between a respective pair qubits of the plurality of qubits, and a plurality of magnetic susceptibility compensators. Each magnetic susceptibility compensator is proximate to a respective qubit of the plurality of qubits. The computational system also includes at least one processor-based device communicatively coupled to the at least one quantum processor, and at least one non-transitory computer-readable storage medium communicatively coupled to the at least one processor-based device and which stores processor-executable instructions. The processor-executable instructions which when executed causes the at least one processor-based device to initialize the quantum processor to an initial state, cause the quantum processor to evolve from the initial state toward a final state, and cause the quantum processor to add a flux bias to the plurality of magnetic susceptibility compensators.

A computational method for operating a hybrid computer including a quantum processor and at least one processor-based device communicatively coupled to one another. The quantum processor including a plurality of qubits, a plurality of coupling devices, where each coupling device provides controllable communicative coupling between two of the plurality of qubits, and a plurality of magnetic susceptibility compensators. Each magnetic susceptibility compensator is proximate to a respective qubit of the plurality of qubits. The method may be summarized as including initializing a quantum processor to an initial state, causing the quantum processor to evolve from the initial state toward a final state, and causing the quantum processor to add a flux bias to a plurality of magnetic susceptibility compensators. The method may further include reading out states for the qubits in plurality of qubits of the quantum processor. The method may further include adding a signal on a global signal line included in the hybrid computer and communicably coupled to the plurality of magnetic susceptibility compensators. Where the hybrid computer further includes a plurality of inductance tuners each interrupting a circuit in each magnetic susceptibility compensator in the plurality of magnetic susceptibility compensators, the method may further include tuning each of the plurality of inductance tuners to a respective value. The respective value is such that each circuit in each magnetic susceptibility compensator in the plurality of magnetic susceptibility compensators has a respective magnetic susceptibility opposite to the magnetic susceptibility of each qubit associated with each magnetic susceptibility compensator in the plurality of magnetic susceptibility compensators.

A computational system for use in quantum processing may be summarized as including at least one non-transitory processor-readable medium that stores at least one of processor executable instructions or data, and at least one processor communicatively coupled to the at least one non-transitory processor-readable medium. In response to execution of the at least one of processor executable instructions or data the computational system receives a plurality of programmable parameters for at least one quantum processor. The programmable parameters characterize a problem Hamilton. The computational system receives a value for a characteristic mutual inductance of antiferromagnetic coupling for the at least one quantum processor and a value for a characteristic magnetic susceptibility of a qubit in the at least one quantum processor. The computational system creates an updated plurality of programmable parameters based at least in part on the received value for the characteristic magnetic susceptibility of the qubit in the at least one quantum processor, and returns the updated plurality of programmable parameters. Examples of the plurality of programmable parameters include a plurality of local biases, and a plurality of coupling values characterizing the problem Hamilton.

A computational method may be summarized as including receiving a plurality of programmable parameters for at least one quantum processor, where the programmable parameters which characterize a problem Hamilton, receiving a value for a characteristic mutual inductance of antiferromagnetic coupling for the at least one quantum processor, and receiving a value for a characteristic magnetic susceptibility of a qubit in the at least one quantum processor. The method may be summarized as including creating an updated plurality of programmable parameters based at least in part on the received value for the characteristic magnetic susceptibility of the qubit in the at least one quantum processor, and returning the updated plurality of programmable parameters. The method may further include constructing a correction matrix, solving a linear system where the linear system includes a first vector, corresponding to a plurality of local biases, equal to the correction matrix right multiplied by a second vector, corresponding to a plurality of updated local biases, for the second vector, and returning the plurality of updated local biases. The method may further include receiving a mapping of a plurality of logical qubits defined on the at least quantum processor, where each logical qubit in the plurality of logical qubits includes a plurality of physical qubits, and a plurality of intra-logical qubit coupler, updating a coupling value for an extra-logical qubit coupler to a logical qubit in the plurality of logical qubits, and returning the updated coupling value for the extra-logical qubit coupler.

A method for correcting distortions to a problem Hamiltonian for a superconducting quantum processor may be summarized as including receiving a plurality of local biases and a plurality of coupling values specifying the problem Hamilton, receiving a value for the product of the characteristic mutual inductance of anti-ferromagnetic coupling and the magnetic susceptibility of a qubit, constructing a correction matrix wherein: the correction matrix is symmetric, the diagonal entries are one, and the entries corresponding to a respective coupling in the problem Hamiltonian are the product of the respective coupling value of the plurality of coupling values, and the value for the product of the characteristic mutual inductance of anti-ferromagnetic coupling and the magnetic susceptibility of a qubit; solve a linear system including a first vector, corresponding to a plurality of local biases, equal to the correction matrix right multiplied by a second vector, corresponding to a plurality of updated local biases, for the second vector; and return the plurality of updated local biases.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", or "another example" means that a particular referent feature, structure, or characteristic described in connection with the embodiment or example is included in at least one embodiment or example. Thus, the appearances of the phrases "in one embodiment", "in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Figure 1:
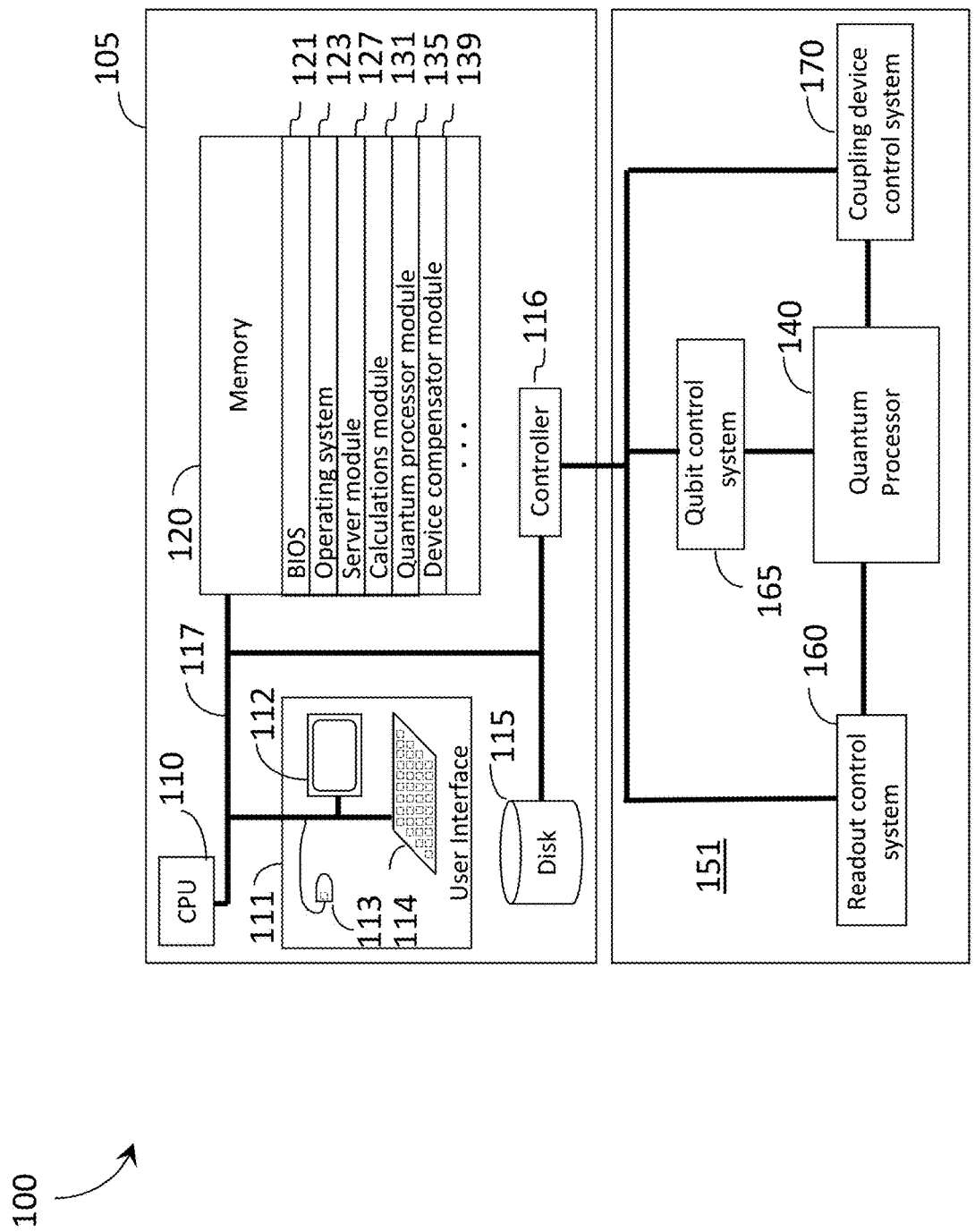
FIG. 1 is a schematic diagram that illustrates an exemplary hybrid computer including a digital processor and an analog processor in accordance with the present systems, devices, methods, and articles.

FIG. 1 illustrates a hybrid computing system 100 including a digital computer 105 coupled to an analog computer 151. In some embodiments the analog computer 151 is a quantum computer and the digital computer 105 is a classical computer. Shown is an exemplary digital computer 105 including a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. Digital computer 105 will at times be referred to in the singular herein, but this is not intended to limit the application to a single digital computer. The present systems and methods can also be practiced in distributed computing environments, where tasks or acts are performed by remote processing devices, which are linked through a communications network. In a distributed computing environment, sets of processor readable instructions, also called program modules, may be located in both local and remote memory storage devices.

Digital computer 105 may include at least one processing unit (such as, central processor unit 110), at least one system memory 120, and at least one system bus 117 that couples various system components, including system memory 120 to central processor unit 110.

The digital processor may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 1 are of conventional design. As a result, such blocks need not be described in further detail herein, as they will be understood by those skilled in the relevant art.

System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown). An basic input/output system ("BIOS") 121, which can form part of the ROM, contains basic routines that help transfer information between elements within digital computer 105, such as during startup.

Digital computer 105 may also include other non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for computer-readable instructions, data structures, program modules and other data for digital computer 105.

Although digital computer 105 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that traditionally is regarded as volatile can have a non-volatile form, e.g., Non-Volatile Dual In-line Memory Module variation of Dual In Line Memory Modules.

Various program modules, application programs and/or data can be stored in system memory 120. For example, system memory 120 may store an operating system 123, and server modules 127. In some embodiments, server module 127 includes instruction for communicating with remote clients and scheduling use of resources including resources on the digital computer 105 and analog computer 151. For example, a Web server application and/or Web client or browser application for permitting digital computer 105 to exchange data with sources via the Internet, corporate Intranets, or other networks, as well as with other server applications executing on server computers.

In some embodiments system memory 120 may store a calculation module 131 to perform pre-processing, co-processing, and post-processing to analog computer 151. In accordance with the present systems and methods, system memory 120 may store at set of analog computer interface modules 135 operable to interact with the analog computer 151.

In some embodiments system memory 120 may store device compensator module 139 to correct for the behavior of one or more types of programmable elements in the analog computer 151. For example, the device compensator module 139 can control one or more magnetic susceptibility compensators present in analog computer 151. In accordance with the present systems, devices, articles, and methods, device compensator module 139 may store instructions to receive data form the analog computer 151 operating without operating magnetic susceptibility compensators, analyze, or transform data to remove distortion from a Hamiltonian. In accordance with the present systems, devices, articles, and methods, device compensator module 139, is an example of a program module or a collection of processor readable instruction. Device compensator module 139 includes processor readable instructions to receive data form the analog computer 151 operating without (or without using) magnetic susceptibility compensators, analyze the data, and transform programmable parameters for the analog processor to account for distortion from a Hamiltonian. For example, one or more of local bias values and one or more coupling values may be redefined by instructions in device compensator module 139 to account for distortion from a Hamiltonian.

While shown in FIG. 1 as being stored in system memory 120, the modules shown and other data can also be stored elsewhere including in nonvolatile memory 115.

The analog computer 151 is provided in an isolated environment (not shown). For example, where the analog computer 151 is a quantum computer, the environment shields the internal elements of the quantum computer from heat, magnetic field, and the like. The analog computer 151 includes an analog processor 140. Examples of an analog processor include quantum processors such as those show in FIG. 2.

A quantum processor includes programmable elements such as qubits, couplers, and other devices. The qubits are readout via readout out system 160. These results are fed to the various modules in the digital computer 105 including server modules 127, calculation module 131, or analog computer interface modules 135, stored in nonvolatile memory 115, returned over a network or the like. The qubits are controlled via qubit control system 165. The couplers are controlled via coupler control system 170. In some embodiments of the qubit control system 165 and the coupler control system 170 are used to implement quantum annealing as described herein on analog processor 140.

In some embodiments the digital computer 105 can operate in a networking environment using logical connections to at least one client computer system. In some embodiments the digital computer 105 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 105 may be connected to the LAN through an adapter or network interface card ("NIC") (communicatively linked to system bus 117). When used in a WAN networking environment, digital computer 105 may include an interface and modem (not shown), or a device such as NIC, for establishing communications over the WAN. Non-networked communications may additionally, or alternatively be employed.

In accordance with some embodiments of the present systems, devices, articles, and methods, a quantum processor may be designed to perform adiabatic quantum computation and/or quantum annealing. An evolution Hamiltonian is proportional to the sum of a first term proportional to the problem Hamiltonian and a second term proportional to the disordering Hamiltonian. As previously discussed, a typical evolution may be represented by Equation (4):

$$H_E \propto A(t)H_D + B(t)H_P \quad (4)$$

where $H_p$ is the problem Hamiltonian, disordering Hamiltonian is $H_D$, $H_E$ is the evolution or instantaneous Hamiltonian, and A(t) and B(t) are examples of an evolution coefficient which controls the rate of evolution. In general, evolution coefficients vary between 0 and 1 inclusive. In some embodiments, the coefficient for the problem Hamiltonian is one. In some embodiments, a time varying evolution coefficient is placed on the problem Hamiltonian. A common disordering Hamiltonian is shown in Equation (5):

$$H_D \propto -\frac{1}{2}\sum_{i=1}^{N} \Delta_i \sigma_i^x \quad (5)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z\sigma_j^z\right] \quad (6)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_P$. Here, the $\sigma_i^z$ and $\sigma_i^z\sigma_j^z$ terms are examples of "diagonal" terms. The former is a single qubit term and the latter a two qubit term. Throughout this specification, the terms "problem Hamiltonian" and "final Hamiltonian" are used interchangeably. Hamiltonians such as $H_D$ and $H_P$ in Equations (5) and (6), respectively, may be physically realized in a variety of different ways. A particular example is realized by an implementation of superconducting qubits.

Figure 2:
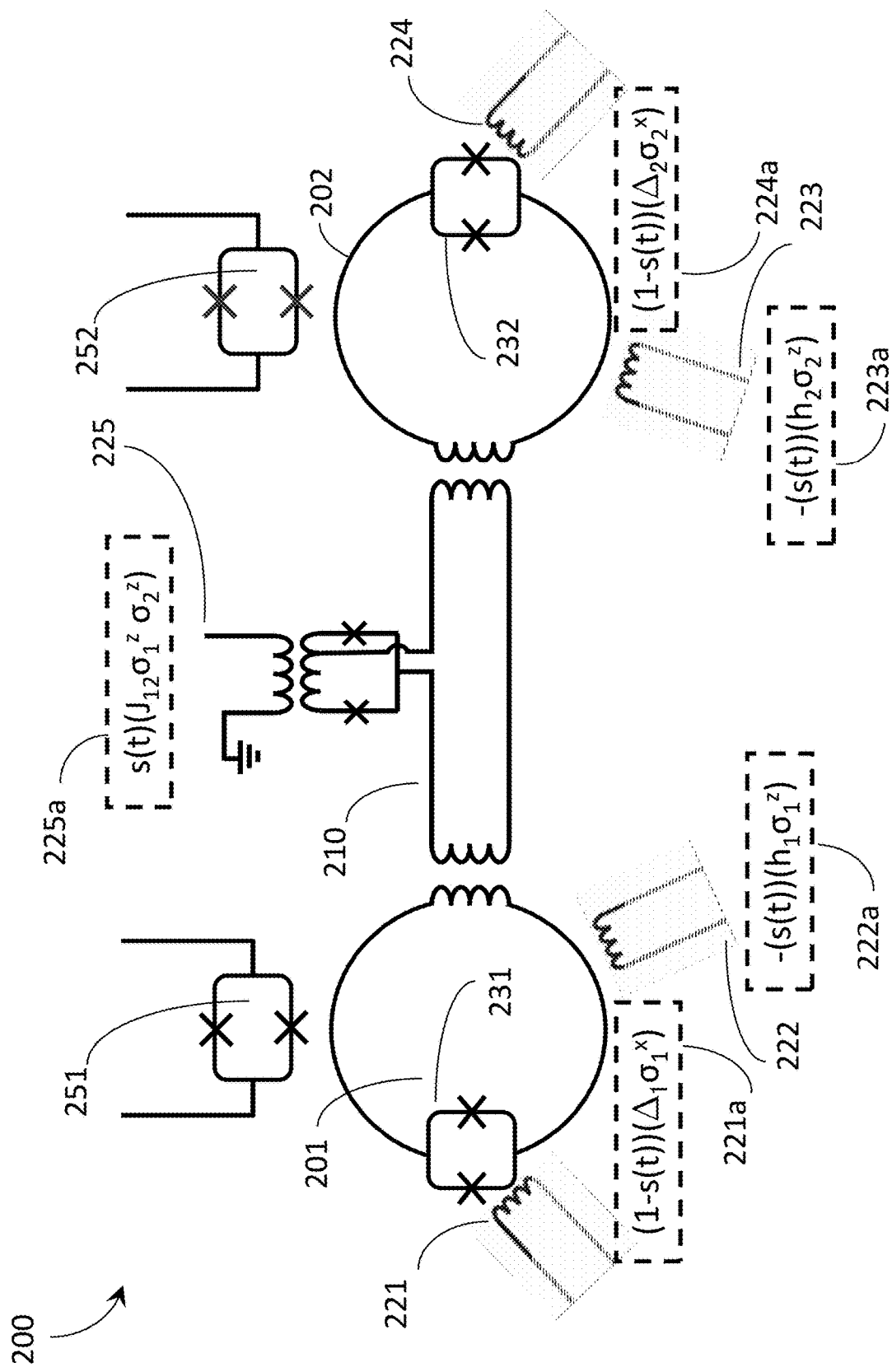
FIG. 2 is a schematic diagram that illustrates a portion of an exemplary superconducting quantum processor designed for quantum annealing and/or adiabatic quantum computing in accordance with the present systems, devices, methods, and articles.

FIG. 2 is a schematic diagram of a portion of an exemplary superconducting quantum processor 200 designed for quantum annealing (and/or adiabatic quantum computing) components which may be used to implement the present systems and devices. The portion of superconducting quantum processor 200 shown in FIG. 2 includes two superconducting qubits 201, and 202. Also shown is a tunable $\sigma_i^z\sigma_j^z$ coupling (diagonal coupling) via coupler 210 therebetween qubits 201 and 202 (i.e., providing 2-local interaction). While the portion of quantum processor 200 shown in FIG. 2 includes only two qubits 201, 202 and one coupler 210, those of skill in the art will appreciate that quantum processor 200 may include any number of qubits and any number of coupling devices coupling information therebetween.

The portion of quantum processor 200 shown in FIG. 2 may be implemented to physically realize quantum annealing and/or adiabatic quantum computing. Quantum processor 200 includes a plurality of interfaces 221-225 that are used to configure and control the state of quantum processor 200. Each of interfaces 221-225 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 221 and 224 may each be used to couple a flux signal into a respective compound Josephson junction 231 and 232 of qubits 201 and 202, thereby realizing the $\Delta_i$ terms in the system Hamiltonian. This coupling provides the off-diagonal $\sigma^x$ terms of the Hamiltonian described by Equation (5) and these flux signals are examples of "disordering signals". Similarly, interfaces 222 and 223 may each be used to apply a flux signal into a respective qubit loop of qubits 201 and 202, thereby realizing the $h_i$ terms, or local bias terms, in the system Hamiltonian. This coupling provides the diagonal $\sigma^z$ terms of Equation (6). Furthermore, interface 225 may be used to couple a flux signal into coupler 210, thereby realizing the $J_{ij}$ terms, coupling terms, in the system Hamiltonian. This coupling provides the diagonal ($\sigma_i^z\sigma_j^z$) terms of Equation (6). In FIG. 2, the contribution of each of interfaces 221-225 to the system Hamiltonian is indicated in boxes 221a-225a, respectively. As shown, in the example of FIG. 2, the boxes 221a-225a are elements of time varying Hamiltonian for quantum annealing and/or adiabatic quantum computing.

Throughout this specification and the appended claims, the term "quantum processor" is used to generally describe a collection of physical qubits (e.g., qubits 201 and 202) and couplers (e.g., coupler 210). The physical qubits 201 and 202 and the coupler 210 are referred to as the "programmable elements" of the quantum processor 200 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 222, 223, and 225) used to apply the programmable parameters (e.g., the $h_i$ and $J_{ij}$ terms) to the programmable elements of the quantum processor 200 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 221 and 224) used to evolve the programmable elements of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 251 and 252, where readout device 251 is associated with qubit 201 and readout device 252 is associated with qubit 202. In some embodiments, such as shown in FIG. 2, each of readout devices 251 and 252 includes a DC-SQUID inductively coupled to the corresponding qubit. In the context of quantum processor 200, the term "readout subsystem" is used to generally describe the readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a flux qubit, the Josephson energy dominates or is equal to the charging energy. In a charge qubit, it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf- SQUID qubits in Bocko et al., 1997, *IEEE Trans. on Appl. Supercond.* 7, 3638; Friedman, et al., 2000, *Nature* 406, 43; and Harris et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubit is controlled by on-chip circuitry. Examples of on-chip control circuitry can be found in U.S. Pat. Nos. 7,876,248; 7,843,209; 8,018,244; 8,098,179; 8,169,231; and 8,098,179.

Figure 3:
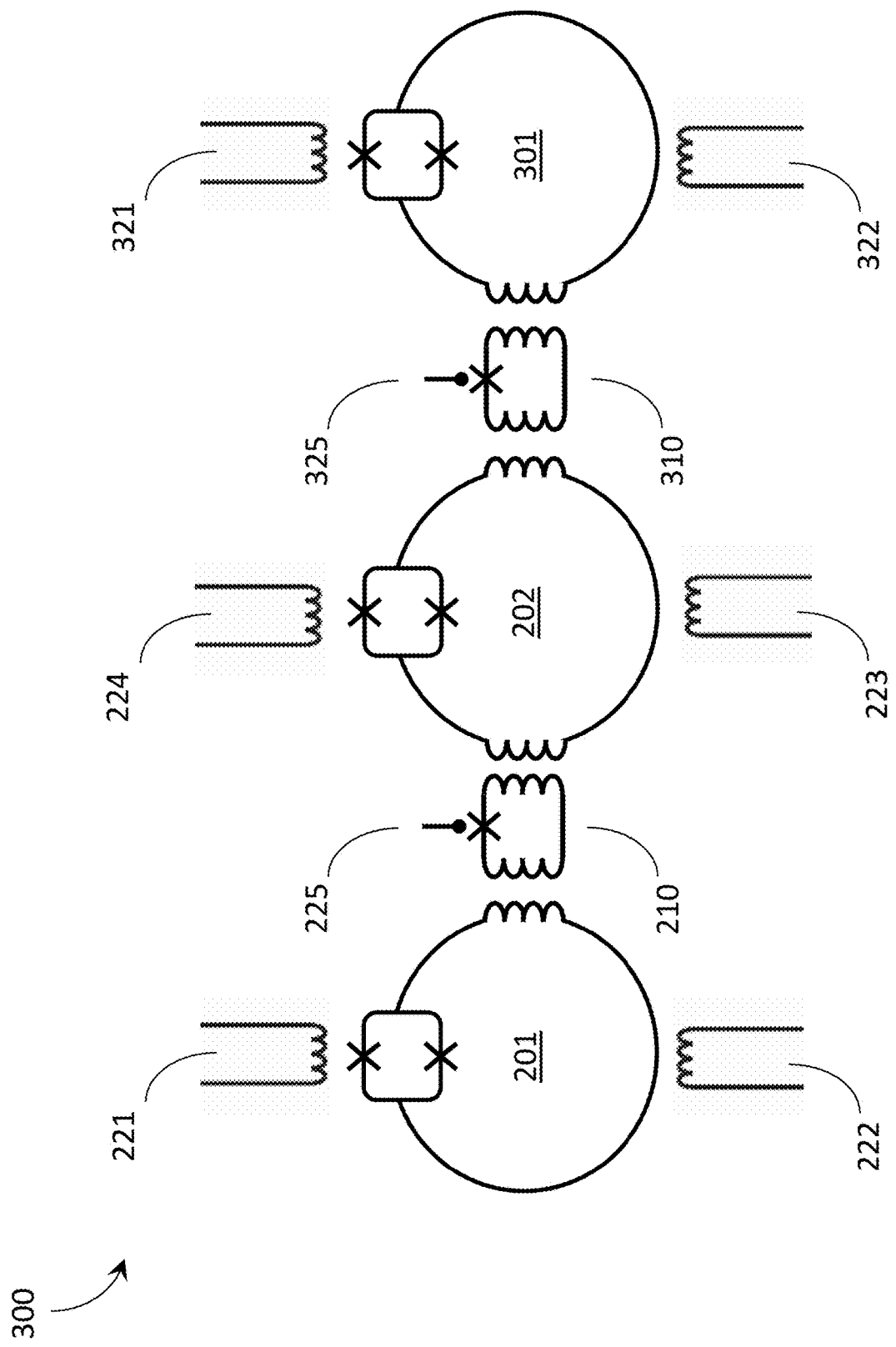
FIG. 3 is a schematic diagram that illustrates a portion of an exemplary superconducting quantum processor in accordance with the present systems, devices, methods, and articles.

FIG. 3 illustrates a portion 300 of an example of an analog processor. Portion 300 is in the form of an exemplary superconducting quantum processor designed for quantum annealing and/or adiabatic quantum computing that exhibits a non-ideal behavior. Portion 300 includes three superconducting qubits 201, 202, and 301. Superconducting qubits 201 and 202 are described above. Also shown is a pair of tunable couplers 210 and 310 between the superconducting qubits 201, 202, and 301 respectively.

The portion 300 of quantum processor includes a plurality of interfaces 221-225, 321, 322, and 325 that are used to configure and control the state of quantum processor. The interfaces 221, 224, and 321 couple a flux signal into a respective compound Josephson junction of qubits 201, 202, and 301, thereby realizing a set of off-diagonal terms in the system Hamiltonian. Similarly, interfaces 222, 223, and 322 apply a flux signal into a respective qubit loop of qubits 201, 202, and 301, thereby realizing a set of diagonal terms in the system Hamiltonian. Further, interfaces 225 and 325 couple a flux signal into couplers 210 and 310, thereby realizing a set of two qubit diagonal terms. The interfaces 225 and 325 are given a compact representation in FIG. 3, but may include the flux sources shown in FIG. 2 for example 225. The off-diagonal one qubit terms are $\Delta_i$ terms. The diagonal one qubit terms are $h_i$ terms. The two qubit diagonal terms are $J_{ij}$ terms.

The non-ideal aspects of the qubits and couplers lead to distortions of the problem Hamiltonian. One of these distortions includes a ghost coupling between two unconnected qubits, each coupled to a common third qubit. A ghost coupling is an unintended coupling. In some examples, a ghost coupling is a weaker coupling than an intended coupling. For example, consider qubit 201 and qubit 301 coupled through qubit 202. This coupling includes a diagonal two qubit coupling term that is not accounted for in the problem Hamiltonian. Another of these distortions includes local bias bleed. In this distortion, a local bias applied to a first qubit results in a local bias value in a second qubit connected to the first qubit. For example, a bias applied to qubit 201 results in a bias applied to qubit 202.

The cause of these distortions is believed to arise from the magnetic susceptibility of qubits such as 201, 202, and 301. The magnetic susceptibility of a qubit is a property of the qubit. It is the response of the qubit's persistent current, $I_p$, to applied external flux, $\Phi^x$.

$$\chi = \frac{\partial I_p}{\partial \Phi^x} \quad (7)$$

Figure 4:
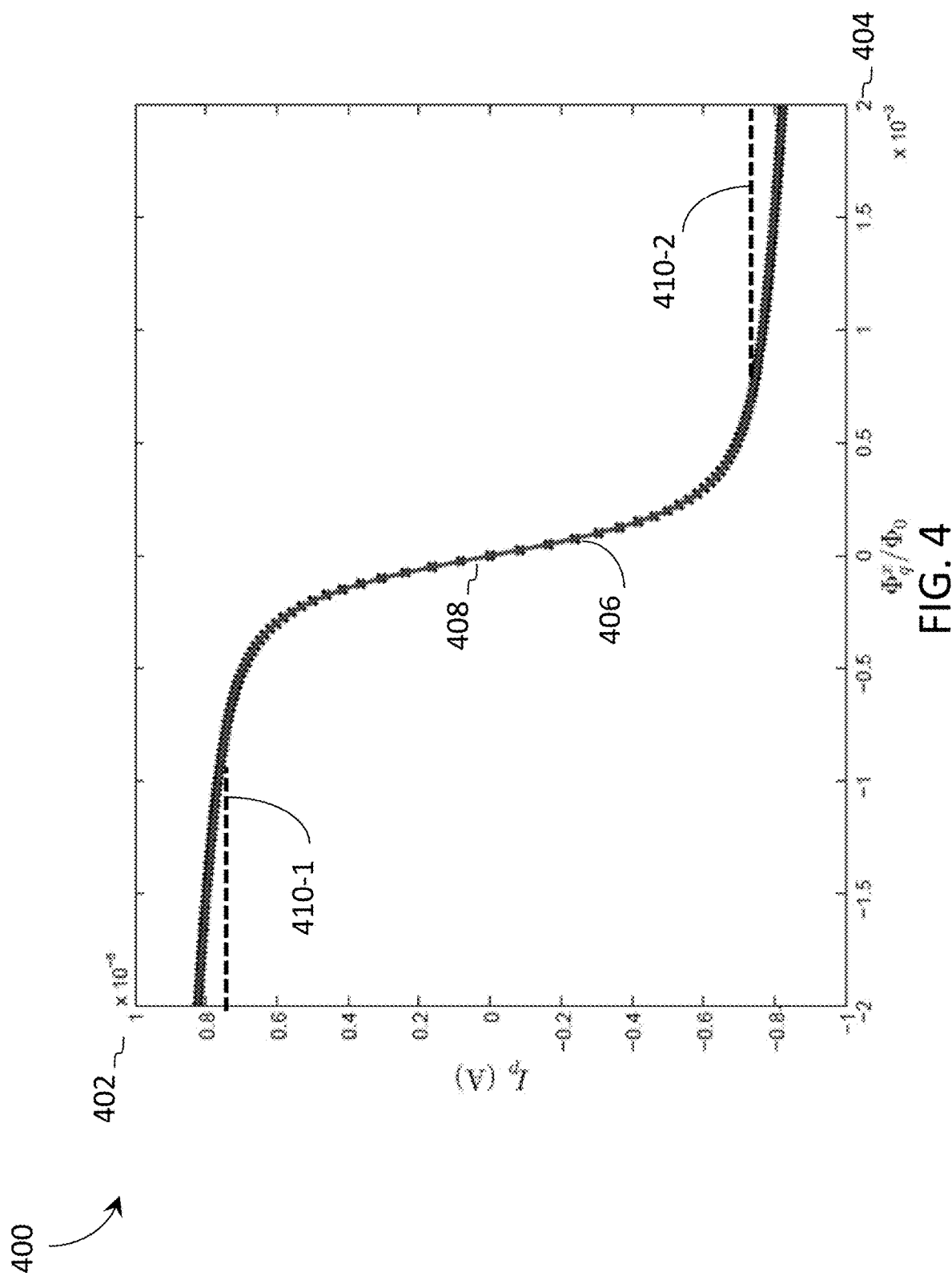
FIG. 4 is a graph that illustrates data from an exemplary rf-SQUID qubit, showing non-ideal response of the persistent current versus applied flux including qubit magnetic susceptibility in accordance with the present systems, devices, methods, and articles.

Data on this property of a qubit is shown herein in, at least, FIG. 4. At least one alternative definition of magnetic susceptibility of qubits exists and differs in sign from Equation (7).

The above described distortions can be modelled mathematically. For convenience the qubits 201, 202, and 301 are labeled i, j, and k. Consider, for example, both ghost coupling and local bias bleed. If a local bias is applied to qubit 202, the ideal term in the qubit Hamiltonian is:

$$h_j \sigma_j^z \quad (8)$$

However, as qubits 201, 202 and 301 in FIG. 3 have a non-zero magnetic susceptibility, the resulting Hamiltonian terms include:

$$h_j \sigma_j^z +$$

$$M_{AFM} \chi_q J_{ij} h_j \sigma_i^z + M_{AFM} \chi_q J_{jk} h_j \sigma_k^z +$$

$$M_{AFM} \chi_q J_{ij} J_{jk} \sigma_i^z \otimes \sigma_k^z \quad (9)$$

The first term of Equation (9) is the ideal term. The second term and third term, on line two, represent local bias bleeds. The fourth and final term is an example of a ghost coupling. There is a common factor, $M_{AFM}\chi_q$ or $M_{AFM}\chi_q$, in all but the ideal term. In some embodiments, this common factor includes a multiplicative constant. The common factor includes the product of the characteristic anti-ferromagnetic mutual inductance of the qubit $M_{AFM}$ and the magnetic susceptibility of the qubit $\chi_q$.

The distortions to the Hamiltonian occur only between certain qubits. The ghost coupling and the bias bleed only propagate through couplers whose value is non-zero in the non-distorted Hamiltonian. Consider Equation (9), if either of the two J terms are zero (e.g., $J_{ij}=0$ or $J_{jk}=0$) the coupling term vanishes. If the coupling between the first qubit and second qubit is zero (i.e., $J_{ij}=0$) in the undistorted Hamiltonian, the local bias bleed to the first qubit is zero. If the coupling between the second qubit and third qubit is zero (i.e., $J_{jk}=0$) in the undistorted Hamiltonian, the local bias bleed to the third qubit is zero.

The distortions to the Hamiltonian can occur in larger lattices. The distortions can lead to excited states becoming ground states, ground states becoming excited states, and the like. That is, when the analog processor returns a configuration of variables, they are ideally a configuration that provides the lowest or nearly the lowest energy. The Hamiltonian is an operator that computes the energy for a configuration. In some embodiments, computing of an energy, given a configuration, is a series of summations like in Equation (6). The Hamiltonian may be the distorted or undistorted Hamiltonian. In some embodiments, distorted Hamiltonians are detected. In some embodiments, distorted Hamiltonians are corrected.

The magnitude of the distortions to the problem Hamiltonian varies with the quantum processor. In some embodiments, the magnitude is set by the term $M_{AFM}\chi_q$. The term $M_{AFM}\chi_q$ can be expressed as a portion of the full energy scale for specifying a problem Hamiltonian on a quantum processor, $M_{AFM}$. In some embodiments, the value of the term $\chi_q$ ranges from a ten thousandth to a half. In some embodiments, the value of the term $\chi_q$ ranges from a thousandth to a tenth of the same value. In some embodiments, the value of the term $\chi_q$ ranges from a hundredth to a fiftieth. In some embodiments, the value of the term $\chi_q$ ranges from 0.01 to 0.05. In some examples of a quantum processor, the value of the term $\chi_q$ ranges from 0.035 to 0.04. In some examples of a quantum processor, the value of the term $\chi_q$ is about 0.015.

The forgoing description can be complemented with a second analysis of qubit-qubit interactions via a coupler. A superconducting flux qubit may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. In certain situations virtually all the current in the loop is supercurrent and the flow of electrons (examples of Fermions) is replaced by a collection of Cooper pairs (examples of Bosons). The Cooper pairs can condense and be governed by one quantum mechanical wave function.

If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting. The superconductivity may be removed by heating the qubit loop above its critical temperature, applying a magnetic field above a critical value, and the like. For the purposes of this specification, the term "persistent current" is used to describe an electrical current circulating in superconducting loop interrupted by at least one Josephson junction. The sign and magnitude of a persistent current may be influenced by a variety of factors, including but not limited to a flux signal $\Phi_X$ coupled directly into the superconducting loop and a flux signal $\Phi_{CJJ}$ coupled into a compound Josephson junction that interrupts the superconducting loop.

The energy scale for specifying a problem Hamiltonian on a quantum processor is given by $M_{AFM}I_P^2$ where $M_{AFM}$ is the anti-ferromagnetic mutual inductance between two superconducting devices communicatively coupled by a coupling device such as two communicatively coupled qubits and $I_p$ is the average persistent current of the two superconducting devices. In some examples, it is desirable to increase this energy scale to improve the performance of the quantum processor. However, coupling devices have an upper-limit to the mutual inductance between two communicatively coupled superconducting devices which is set by the coupler inductance and the device-to-coupler mutual inductance. The anti-ferromagnetic mutual inductance between two communicatively coupled superconducting devices, labeled L and R, is given by:

$$M_{AFM}M_L M_R \chi_{CO} + M_{qu-qu} \quad (10)$$

Where $M_L$ is the mutual inductance between the first superconducting device and the coupling device, $M_R$ is the mutual inductance between the second superconducting device and the coupling device, and $\chi_{CO}$ is the susceptibility of the coupling device (i.e., how strongly the coupling device couples the two superconducting devices together). As well, $M_{qu-qu}$ is the intended mutual inductance between the two communicatively coupled superconducting devices. See U.S. patent application publication US 2015-0032991 A1 for further examples of intended mutual inductance between qubits.

The susceptibility of a coupling device is set by a flux bias of the coupling device given by $\phi_{CO}$. Increasing the critical current Ic of the coupler will increase $\chi_{CO}$ to an upper limit of 1/Lco where Lco denotes the inductance of the coupler. Therefore, by increasing the persistent current of the coupling devices in a quantum processor by a large factor (for example, more than 10 times the persistent current), $\chi_{CO}$ can be almost doubled. However, increasing the persistent current of a coupling device increases the coupler beta (a convenience parameter representing the behavior of a superconducting loop such as a coupling device that is used for modeling purposes, also called normalized inductance). The beta ($\beta$) of a coupling device is given by:

$$\beta = \frac{2\pi L_{co} I_C}{\Phi_0} \quad (11)$$

where $\Phi_0$ is the flux quantum of the superconducting loop. Increasing coupler beta increases the slope of the coupler susceptibility in the Ferromagnetic region. Therefore, the coupler critical current cannot be increased by much without sacrificing the precision to which ferromagnetic/anti-ferromagnetic couplings can be specified.

The ideal coupling value between a pair of flux qubits connected by a coupler is much larger than a ghost coupling. For example, consider a flux qubit, indexed as i, that may be coupled to a qubit, indexed as j, via a coupler. The mutual inductance between the flux qubit i and the coupler is denoted $M_i$. The mutual inductance between the flux qubit j and the coupler is denoted $M_j$. The persistent current in the flux qubit i is denoted $I_p^i$. The persistent current in the flux qubit j is denoted $I_p^j$. The magnetic susceptibility of the coupler is denoted $\chi_{CO}$. In some examples, the coupling value is:

$$J_{ij} = I_p^i I_p^j M_i M_j \chi_{CO} \quad (12)$$

In some examples, the coupling value a is dimensionless quantity:

$$J_{ij} = \frac{I_p^i I_p^j M_i M_j \chi_{CO}}{M_{AFM}} \quad (13)$$

FIG. 4 shows a graph 400 of the response of persistent current $I_P$ within a superconducting flux qubit to applied external flux, $\Phi_q^x$. The graph 400 shows how the qubit deviates from the ideal. In the graph 400, the persistent current is plotted against applied external flux. The persistent current measured is measured in micro-amperes on vertical axis 402 and the external flux in units of milli-flux quanta on horizontal axis 404. The data points 406 are plotted in the plane and fitted with a curve 408. The shape (e.g., the inflection) in the curve 408 relates to the tunneling behavior of the qubit. As the tunneling rate of the qubit increases, the curve 408 deviates more from a step function. In the graph 400, the tunneling rate of the qubit is about 1 gigahertz.

The non-ideal aspects of the superconducting flux qubit are shown in FIG. 4. Away from the inflection point of the curve 408, the persistent current of the qubit increases in response to applied flux. The slope of the curve 408 is non-zero. Considering Equation (7), this means the superconducting flux qubit is non-ideal. An example of an ideal response is show as lines 410-1 and 410-2. Such an ideal response would be for a spin the magnetic moment of which does not change with applied flux.

As previously discussed, a superconducting flux qubit may comprise a qubit loop interrupted by at least one Josephson junction, or at least one compound Josephson junction. Since a qubit loop is superconducting, it effectively has no electrical resistance. Thus, electrical current traveling in a qubit loop may experience no dissipation. If an electrical current is induced in the qubit loop by, for example, a magnetic flux signal, this current may be sustained indefinitely. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in a qubit loop of a superconducting qubit. The sign and magnitude of a persistent current are influenced by a variety of factors, including but not limited to a flux signal $\phi_x$ coupled directly into the qubit loop and a flux signal $\phi_{CJJ}$ coupled into a compound Josephson junction that interrupts the qubit loop.

Figure 5:
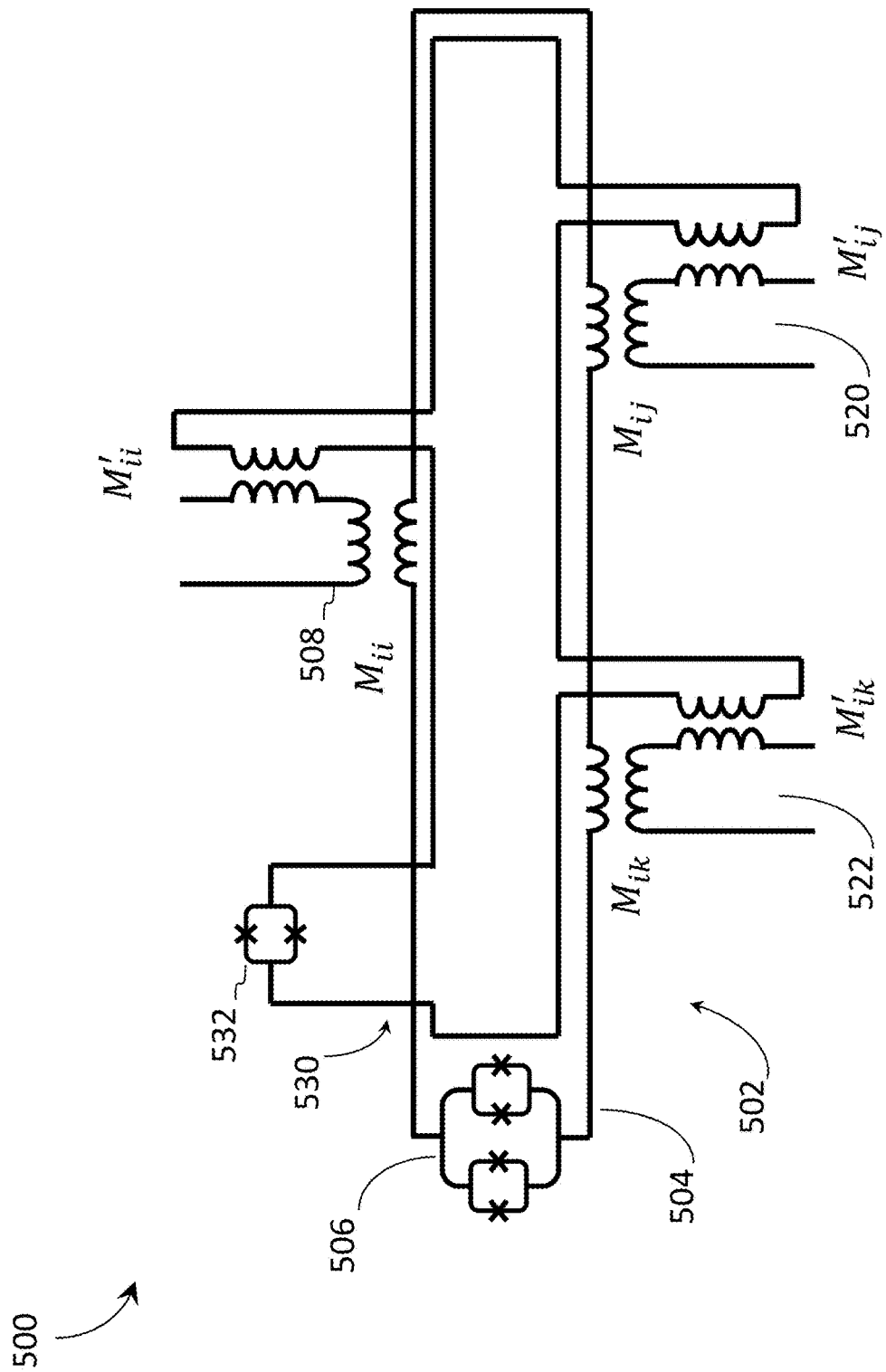
FIG. 5 is a schematic diagram that illustrates a portion of an exemplary superconducting quantum processor including a compensator structure to correct for qubit magnetic susceptibility in accordance with the present systems, devices, methods, and articles.

FIG. 5 illustrates a portion of an exemplary superconducting quantum processor including a magnetic susceptibility compensator. The portion 500 includes a first qubit 502 including a qubit body 504 forming a loop. The qubit body 504 is made from a superconducting material that superconducts in a range of temperatures and magnetic fields that are below a critical temperature and a critical field strength. In some embodiments, the qubit body includes a compound Josephson junction 506. The compound Josephson junction 506 may include further compound Josephson junctions as described in U.S. Pat. No. 8,536,566. In some embodiments, the qubit 502 includes flux sources to effect changes in qubit bias and tunneling rate. These are not shown in FIG. 5.

In some embodiments, the qubit 502 is includes a persistent current compensator 508. In some embodiments, the persistent current compensator 508 is present and not used. In some embodiments, the persistent current compensator 508 is not present. The persistent current compensator 508 is inductively coupled to the qubit body 504 via mutual inductive inductance $M_{ii}$. The role of the persistent current compensator 508 is to change the persistent current caused by modulating the flux in the compound Josephson junction 506. Modulation of a flux in a compound Josephson junction is described above for at least interfaces 221 and 224 in FIG. 2.

An approach to quantum annealing with superconducting flux qubits includes using fixed flux biases applied to the qubit loops through a programming interface (e.g. 222a of FIG. 2). Using a fixed bias, however, does not account for the fact that modulation of the control signal applied to the compound Josephson junction (e.g. 506 of FIG. 5, and 231 of FIG. 2) of a given qubit influences both the qubit's tunnel splitting ($\Delta_i$) and the qubit's persistent current. Therefore, adjusting the compound Josephson junction biases to effect a desirable change in the qubit's tunnel splitting term also can create an undesirable change in the magnitudes of $h_i$ in the problem Hamiltonian. In some embodiments, by applying a flux signal to the qubit that is proportional to the product of the intended bias, the anti-ferromagnetic mutual inductance, and the instantaneous persistent current, the effect of adjusting the compound Josephson junction bias on the persistent current can be reduced or eliminated. That is, a flux bias designed to mimic the growth in the persistent current in a flux qubit can be applied to a flux qubit to maintain the local bias values and the coupling values in the system Hamiltonian. Further details on persistent current compensation systems, devices, articles, and methods are described in, for example, US Patent Application Publication US 2011-0060780 A1, and U.S. Pat. No. 7,135,701 and Harris et al., 2010 "Experimental investigation of an eight-qubit unit cell in a superconducting optimization processor" Phys. Rev. B 82, 024511.

In some examples, a persistent current compensator 508 includes a persistent current compensation line for compensating for changing persistent current in a qubit such that the problem local bias terms and the coupling terms remain in constant, or in a constant target range, throughout annealing. In some examples a quantum processor includes a plurality of a plurality of qubits; a plurality of coupling devices, wherein each coupling device provides controllable communicative coupling between two of the plurality of qubits and at least one global signal line. Each qubit is communicably coupled to the at least one global signal line. In some examples, the at least one global signal line includes an annealing signal line that carries an annealing signal to evolve the quantum processor during quantum annealing computation. In some examples, the at least one global signal line includes a persistent current compensation line able to compensate for changing persistent current in a qubit such that the problem local bias terms and the coupling terms remain in constant target throughout annealing. The qubit 502 is coupled to a plurality of couplers. Portions of first coupler 520 and a second coupler 522 are shown. The couplers 520 and 522 may be used to couple qubit 502 to other qubits. In some embodiments, the qubit is coupled to three couplers. In some embodiments, the qubit is coupled to four couplers.

In some embodiments, the qubit 502 is inductively coupled to a plurality couplers. The coupling between qubit 502, indexed as i, and the coupler 520, indexed as j, has a mutual inductance $M_{ij}$. The coupling between qubit 502 and the coupler 522, indexed as k, has a mutual inductance $M_{ik}$.

A magnetic susceptibility compensator 530, or compensator structure 530, is proximally located with respect to qubit 502. The compensator structure 530 includes a body of superconducting material formed into a loop. In some embodiments, the loop in compensator structure 530 is interrupted by a tunable inductance. In some embodiments, the tunable inductance is a compound Josephson junction 532. In some embodiments, the tunable inductance includes a plurality of compound Josephson junctions. The compensator structure 530 is inductively coupled to the first coupler 520 and the second coupler 522. The coupling between the compensator structure 530, indexed as i, and the coupler 520, indexed as j, has a mutual inductance $M_{ij}'$. The coupling between the compensator structure 530 and the coupler 522, indexed as k, has a mutual inductance $M_{jk}'$.

In some embodiments, the coupling between the qubit 502 and its associated elements including the persistent current compensator 508, the coupler 520, the coupler 522, and the like; and between the compensator structure 530 and its associated elements, are matched. In some embodiments, the ratio of the mutual inductance between an associated element and the qubit 502 to the mutual inductance between an associated element and the compensator structure 530 is about equal across all associated elements to the qubit 502. In some embodiments, the ratios are within ten percent of equal (i.e., 1:1). In some embodiments, the ratios are equal:

$$\frac{M_{ii}'}{M_{ii}} = \frac{M_{ij}'}{M_{ij}} = \frac{M_{ik}'}{M_{ik}} \tag{14}$$

That is, a plurality of ratios are equal. A first ratio is the value of a first coupling of the global signal line to the magnetic susceptibility compensator, to the value of a second coupling of the global signal line to the qubit. A second ratio is the value of a third coupling of the magnetic susceptibility compensator to a first coupler, to the value of a fourth coupling of the qubit to the first coupler. A third ratio is the value of a fifth coupling of the magnetic susceptibility compensator to a first coupler, to the value of a sixth coupling of the qubit to the first coupler.

The current in the compensator structure 530 is tunable to correct for the magnetic susceptibility of qubit 502. In some embodiments, the tuning is effected by adjusting the flux threading compound Josephson junction 532. In some embodiments, the correction provides a magnetic susceptibility for the compensator structure 530 that is equal and opposite to the magnetic susceptibility of the qubit 502. In some embodiments, the correction provides a magnetic susceptibility for the compensator structure 530 that is opposite to the magnetic susceptibility of the qubit 502 but unequal. There may be an over-correction or under-correction. In some embodiments, the magnetic susceptibility of the compensator is tuned such that the following equation is satisfied:

$$M_{ii}'\chi_{Comp} = -M_{ii}\chi_q \tag{15}$$

That is, a first product of the coupling of the global signal line to the magnetic susceptibility compensator and the magnetic susceptibility of the magnetic susceptibility compensator equals the negative of a second product of the coupling of the global signal line to the qubit and the magnetic susceptibility of the qubit.

In operation, the portion of the exemplary superconducting quantum processor shown in FIG. 5 operates as a quantum processor with extra program interfaces. The provision of programming interfaces to a superconducting quantum is described in PCT Patent Publication WO2012064974. Other than these extra parameters, the quantum processor implements an evolution for the quantum processor for quantum annealing (and/or adiabatic quantum computing) without adjustment. A problem is received as specified biases and a plurality of couplings. The problem graphs are embedded in hardware graphs of the quantum processor. The quantum processor is evolved. The results are read out.

Figure 6:
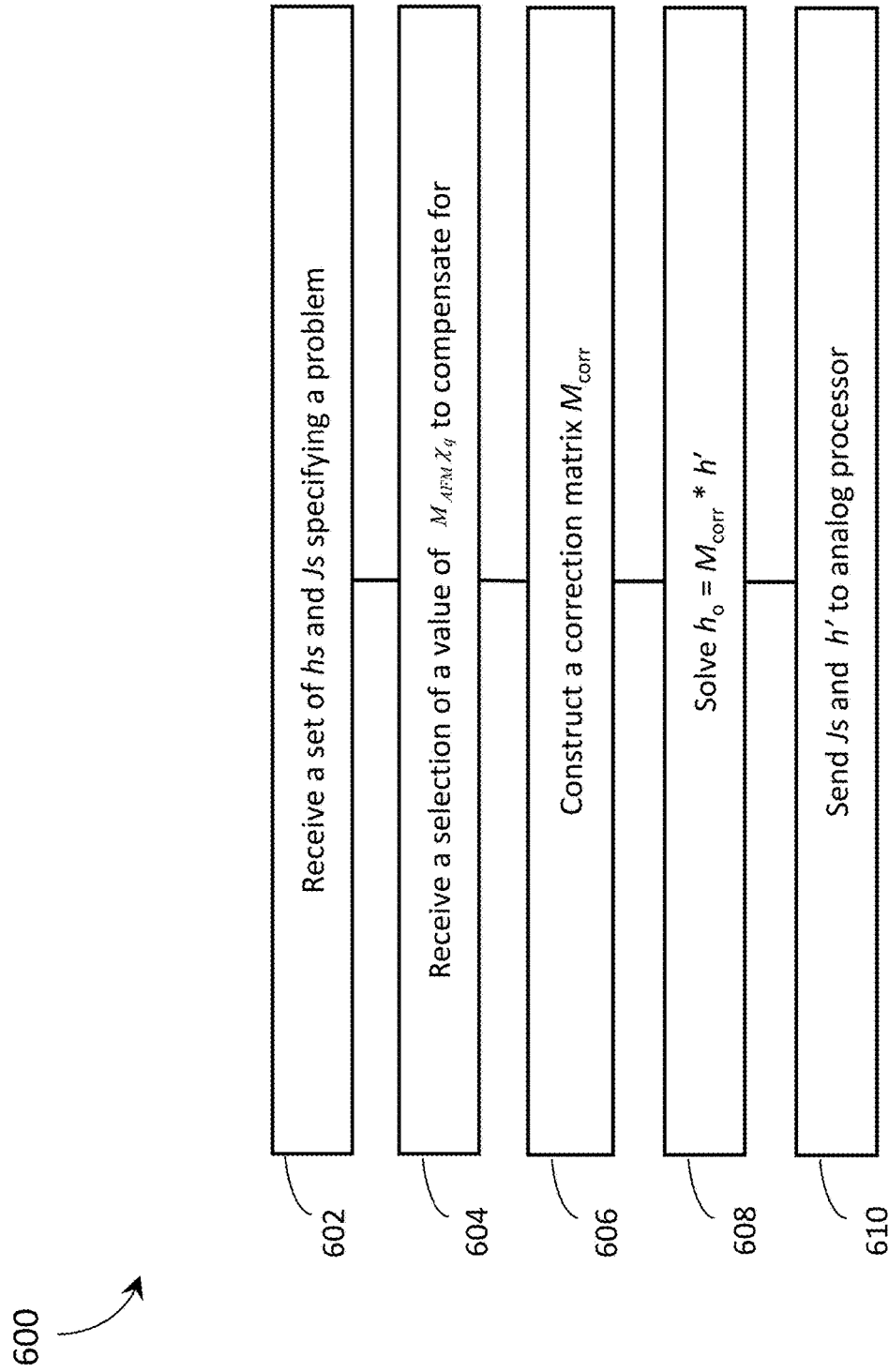
FIG. 6 is a flow diagram showing a method for updating local bias values for use in a quantum processor without a magnetic susceptibility compensator in accordance with the present systems, devices, methods, and articles.
Figure 7:
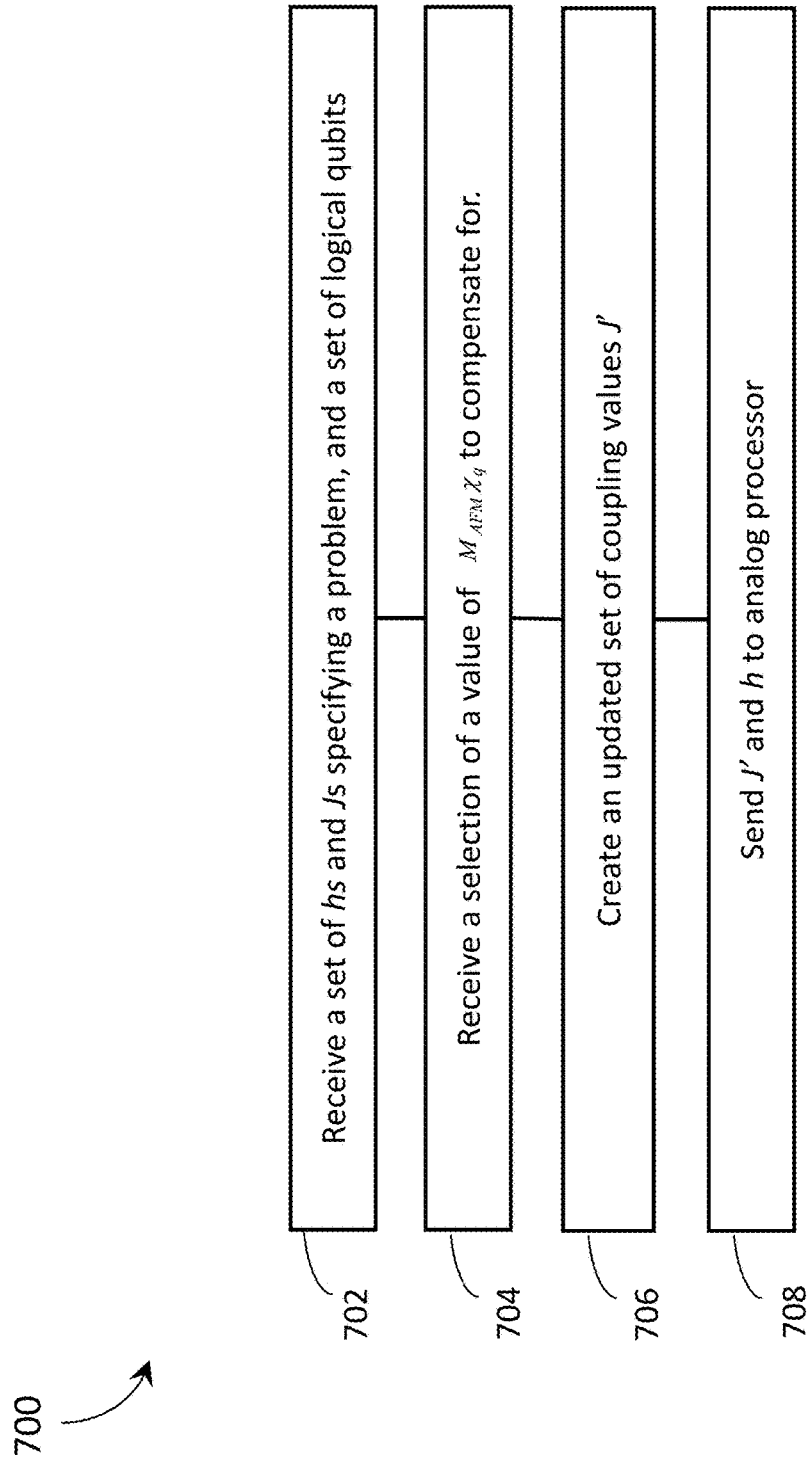
FIG. 7 is a flow diagram showing a method for updating coupling values for use in a quantum processor including logical qubits and without a magnetic susceptibility compensator in accordance with the present systems, devices, methods, and articles.

FIGS. 6 and 7 show methods to compensate for distortions to programmable parameters of a Hamiltonian without using a magnetic susceptibility compensator. An example of programmable parameters is the plurality of local bias values for a plurality of qubits. Another example of programmable parameters is the plurality of coupling values for a plurality of couplers between pairs of qubits in a plurality qubits. In some examples, methods to compensate for distortions to programmable parameters combine methods to correct both the plurality of local bias values and the plurality of coupling values.

FIG. 6 shows a method 600 executable by circuitry to compensate for distortions to local bias terms in a Hamiltonian without using a magnetic susceptibility compensator. For the method 600, as with other methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital processor and an analog processor such as hybrid computer 100). In some embodiments, the method 600 is performed by machine running executable instructions from device compensator module 139 of FIG. 1. In some embodiments, the method 600 is performed by quantum processor controller. This example is used in the description of method 600.

At 602, a quantum processor controller receives a plurality of local biases and a plurality of couplings. The biases and couplings specify a problem Hamiltonian. In some embodiments, the problem Hamilton is a non-distorted Hamiltonian.

At 604, a value for the product of the characteristic mutual inductance of anti-ferromagnetic coupling and the magnetic susceptibility of a characteristic qubit is received. In some embodiments, the product is the $M_{AFM}\chi_q$ value described above. For example, the value can be $0.015\, M_{AFM}$. In some embodiments, the value is provided by a user of a computer in communication with the quantum processor controller. In some embodiments, a value is suggested by the quantum processor controller.

At 606, the quantum processor controller constructs a correction matrix, $M_{corr}$. The correction matrix includes the following properties: symmetry about the diagonal, has ones on the diagonal, and adjusted values elsewhere. A respective adjusted value is proportional to the product of a respective coupling value for the entry in matrix as determined by the plurality of couplings, and the product of the characteristic mutual inductance of anti-ferromagnetic coupling and the magnetic susceptibility of a qubit in the quantum processor. For example, if the plurality of couplings specifies a non-zero coupling value between the $i^{th}$ qubit and the $j^{th}$ qubit then the entry on the $i^{th}$ row and $j^{th}$ column of the matrix will be a value proportional to the product of the characteristic mutual inductance of anti-ferromagnetic coupling, the magnetic susceptibility of a qubit in the quantum processor, and the coupling value between the $i^{th}$ qubit and the $j^{th}$ qubit.

At 608, the quantum processor controller solves a linear system. In some embodiments, the linear system is a first vector ($h_0$), corresponding to the plurality of local biases, equated to the correction matrix right multiplied by a second vector (h'), corresponding to a plurality of updated local biases. The solution determined is the values of second vector, h'. Consider the linear system:

$$h_0 = M_{Corr} h' \tag{16}$$

In some embodiments, where method 600 is performed by a processor-based device that is not a quantum processor controller, processor-based device, method 600 returns the plurality of updated local biases associated the values of second vector, h'.

At 610, an optional operation, the plurality of updated local biases and the plurality of couplings are used by the quantum processor controller to define a problem on a quantum processor that implements quantum annealing and/or adiabatic quantum computing.

FIG. 7 shows a method 700 executable by circuitry to compensating for distortions to coupling values in a Hamiltonian for a quantum processor including logical qubits and without using a magnetic susceptibility compensator. In some embodiments, the method 700 is performed by quantum processor controller. This example is used in the description of method 700.

At 702, a quantum processor controller receives a plurality of coupling values, Js. The coupling values specify, in part, a problem Hamiltonian.

Also at 702, the quantum processor controller receives information characterizing a set of logical qubits. An example of this information is a mapping of physical qubits to logical qubits. A logical qubit comprises two or more physical qubits, and one or more intra-logical qubit couplers connecting the two or more physical qubits in a chain. These intra-logical qubit couplers define a chain of qubits. These intra-logical qubit couplers have a strong coupling value. In some examples, intra-logical qubit couplers are set to strong ferromagnetic coupling values. These chains of qubits define logical qubits. A plurality of logical qubits can be included a logical graph. Each node represents a logical qubit and the edges in the graph are available communicative coupling between logical qubits. The quantum processor controller extracts the intra-logical qubit couplers from the information characterizing a set of logical qubits.

At 704, a value for the product of the characteristic mutual inductance of anti-ferromagnetic coupling and the magnetic susceptibility of a characteristic qubit is received. In some embodiments, the product is the $M_{AFM}\chi_q$ value described above. For example, the value can be 0.015 $M_{AFM}$. In some embodiments, the value is provided by a user of a computer in communication with the quantum processor controller. In some embodiments, a value is suggested by the quantum processor controller.

At 706, the quantum processor controller constructs updated set of coupling values. An intended coupling for an extra-logical qubit coupler can be adjusted to account for a distortion in the Hamiltonian of the quantum processor.

Figure 8:
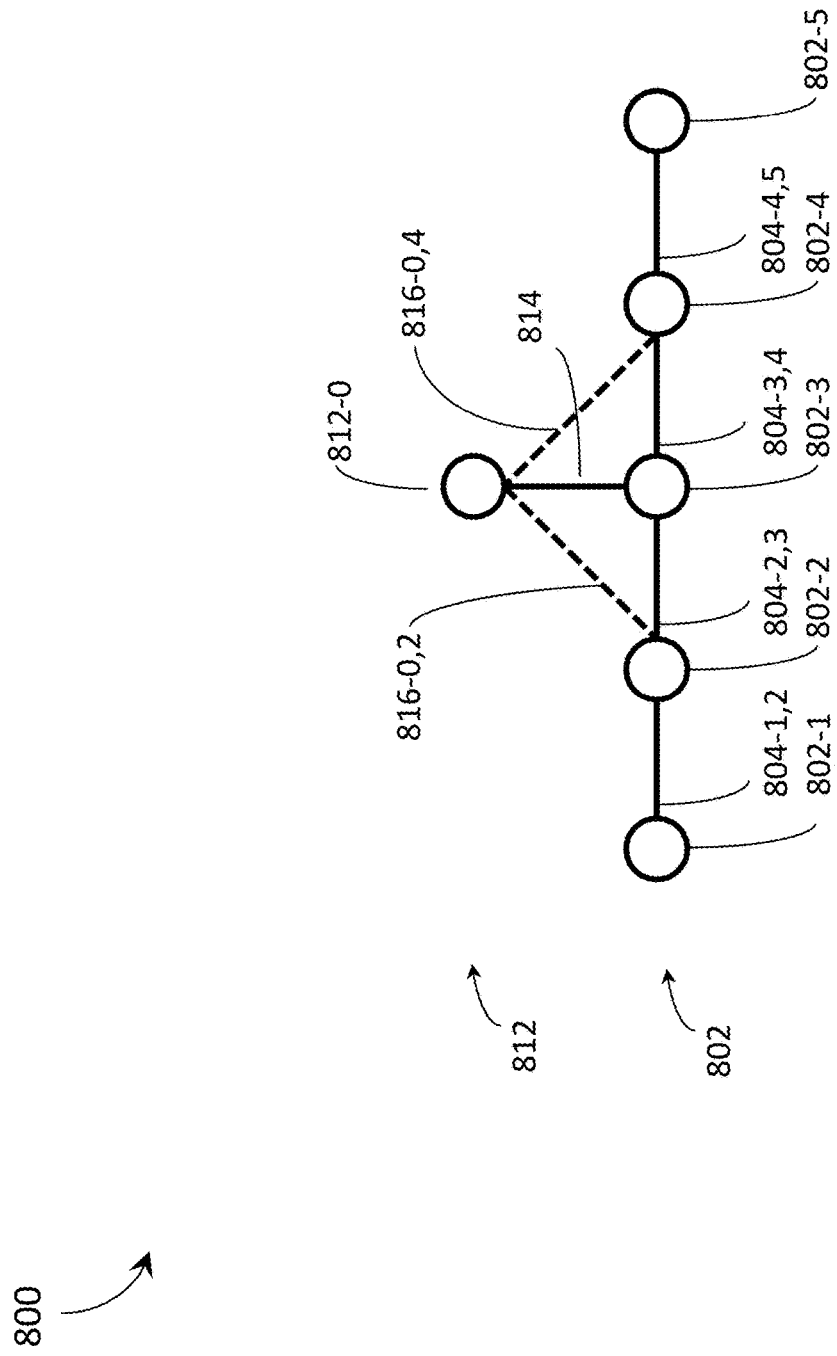
FIG. 8 is a schematic diagram that illustrates a portion of an exemplary superconducting quantum processor in accordance with the present systems, devices, methods, and articles.

Consider an intended coupling between a logical qubit and at least one physical qubit. FIG. 8 is a schematic diagram that illustrates a portion of an exemplary superconducting quantum processor. A logical qubit 802 includes five physical qubits (802-1, 802-2, 802-3, 802-4, 802-5). There are four intra-logical qubit couplers (804-1,2; 804-2,3; 804-3,4; 804-4,5) in the logical qubit 802. In some examples, the intra-logical qubit couplers, collectively 804, have strong coupling values. In some examples, the strong coupling values are ferromagnetic. The coupling values for the intra-logical qubit couplers can have homogenous or heterogeneous values. An example of a physical qubit distinct from the logical qubit 802, is physical qubit 812. The physical qubit 812 could be part of an unseen logical qubit. The physical qubit 812 can be given an index. A convenient index is 0 for physical qubit 812, or 812-0.

There is an intended coupling between the logical qubit 802 and a physical qubit 812 by a coupler 814. The intended coupling value is $J_{0,3}$. However, owing to the non-ideality of qubit 802-3, there could be a ghost coupling 816-0,2 between qubits 812-0 and 802-2 and/or a ghost coupling 816-0,4 between qubits 812-0 and 802-4.

Knowing that the strong coupling values in the intra-logical qubit keep the logical qubit in a confided sub-space of states, a correction scheme can be devised to correct for ghost couplings like ghost coupling 816-0,2 and/or ghost coupling 816-0,4. For example, the intended coupling $J_{0,3}$ between physical qubit 812-0 and physical qubit 802-3 could be updated as follows:

$$J_{0,3}' = J_{0,3} - M_{AFM}\chi_q J_{0,3} J_{2,3} - M_{AFM}\chi_q J_{0,3} J_{3,4} \tag{16}$$

That is, an intended coupling value is adjusted by a correction term. The updated coupling value is replaced with the non-updated coupling value minus a correction term. In some examples, the correction term is a summation over the product of the following terms: the anti-ferromagnetic mutual inductance between two superconducting devices communicatively coupled by a coupling device, $M_{AFM}$; the magnetic susceptibility of a qubit, $\chi_q$; the intended coupling between the physical qubit and the logical qubit, $J_{0,3}$; and, the indexed term of the summation, the intended coupling value for the coupling between a first qubit in the logical qubit proximate to the coupler for defining the coupling to the extra-logical qubit physical qubit and neighboring qubit to the first qubit, for example, $J_{3,4}$. For example, the intended coupling $J_{0,3}$ between physical qubit 812-0 and physical qubit 802-3 could be updated as follows:

$$J_{0,3}' = J_{0,3} - M_{AFM}\chi_q J_{0,3} \sum_{i \in N(3)} J_{i,3} \tag{17}$$

where N(3) are the neighbors of qubit 802-3 in the logical qubit 802. The indices in the logical qubit 802 are arbitrary and in different examples different indices are used.

Referring again to FIG. 7, in some embodiments, where method 700 is performed by a processor-based device that is not a quantum processor controller, processor-based device, returns the plurality of updated coupling values associated the values of second matrix, J'.

At 708, an optional operation, the quantum processor controller uses the plurality of updated coupling values to define an updated problem on a quantum processor that implements quantum annealing and/or adiabatic quantum computing.

Figure 9:
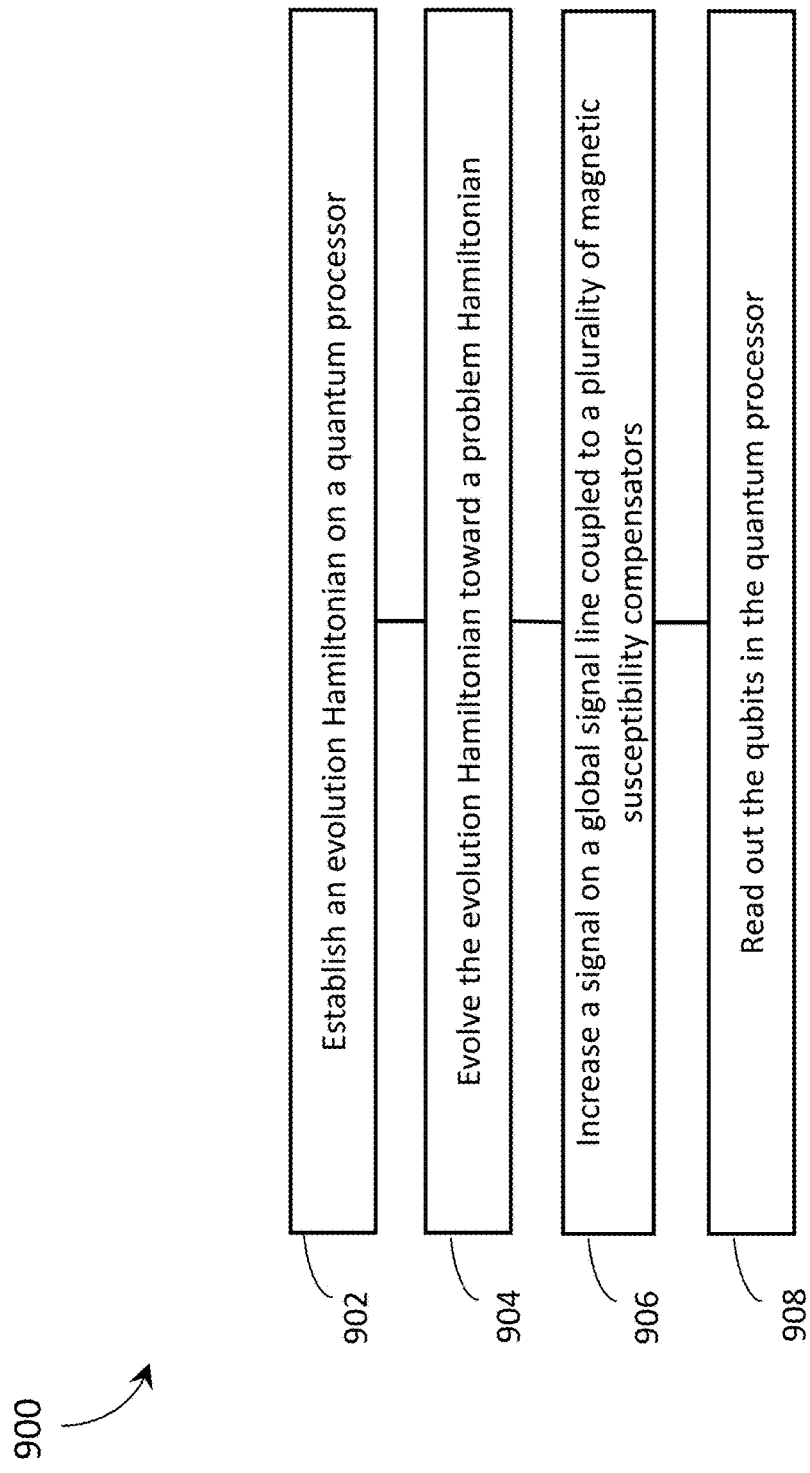
FIG. 9 is a flow diagram showing a method for performing quantum annealing with superconducting flux qubits and a magnetic susceptibility compensator structure in accordance with the present systems, devices, methods, and articles.

FIG. 9 shows a method 900 executable by circuitry to perform quantum annealing with superconducting flux qubits and a plurality magnetic susceptibility compensators. A hybrid computer may perform one or more of the acts in method 900.

At 902, a hybrid computer establishes an evolution Hamiltonian on a quantum processor. An example of a quantum processor is a superconducting quantum processor, such as, shown in FIG. 2. In some examples, the evolution Hamiltonian includes a disordering component. See Equation (5) for an example of a disordering component. An example of an evolution Hamiltonian is described by Equation (4). It includes a disordering Hamiltonian and problem Hamiltonian with time varying coefficients. In some embodiments, the hybrid computer uses a programming sub-system to establish an evolution Hamiltonian on a quantum processor.

At 904, the hybrid computer causes the quantum processor to be annealed towards a final state associated with a problem Hamiltonian. In some embodiments, an evolution sub-system is used to gradually remove the disorder terms in the evolution Hamiltonian. For example, for a superconducting flux qubits, the hybrid computer raises the height of barriers between the potential wells in the energy profiles of the qubits. The raising of barriers suppresses quantum tunneling a source of disordering. As the hybrid computer causes the quantum processor to be annealed towards the final state the influence of the disordering Hamiltonian relative to the influence of the problem Hamiltonian declines. In some implementations, a plurality of local bias value and coupling values defining the problem Hamiltonian are slowly applied to the quantum processor. In some examples, the plurality of local bias values and coupling values are present and the magnitude of the disordering terms, relative to the plurality of local bias value and coupling values, are decreased.

As previously described, the annealing process removes the disorder terms and also induces changes in the qubit persistent currents which result in a discontinuous evolution path. This adverse effect can be addressed by compensating for the persistent current in a plurality of flux qubits. During the annealing process, the hybrid computer causes a varying of the local flux biases that define the problem Hamiltonian. The varying of the local flux biases compensates for the changes in the qubit persistent currents induced by the annealing. In some embodiments, a signal applied to a global signal line matches in profile the growth in persistent current in the qubits. In some implementations, this compensation is controlled such that the ratio of local bias terms to two qubit coupling terms (e.g., ferromagnetic, antiferromagnetic, or some intermediate form of coupling) remains substantially constant throughout the annealing process. That is, in the notation used herein, the ratio of $h_i$ to $J_{ij}$ is constant.

At 906, the hybrid computer cases a flux bias to be applied to a plurality of magnetic susceptibility compensators. In some implementations, acts 904 and 906 happen at the same time. A signal applied to the global signal line matches in profile the growth in persistent current in the qubits. In some embodiments, the growth in the global signal line is communicatively coupled to a plurality of plurality magnetic susceptibility compensators. The global signal line is inductively coupled to the plurality of magnetic susceptibility compensators. An example of inductive coupling is shown in FIG. 5.

At 908, a state of the system is measured. In some implementations, this may involve reading out the state of all or a portion of the qubits in the quantum processor by, for example, a readout subsystem. In some examples, the readout subsystems uses one or more DC-SQUIDs to measure the persistent current state of each qubit. Further descriptions of systems, devices, methods, and articles for qubit readout are described in U.S. Pat. Nos. 7,639,035; 8,169,231; and 8,854,074.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the US patents, US patent application publications, US patent applications, referred to in this specification and/or listed in the Application Data Sheet, including but not limited to U.S. Provisional Patent Application No. 61/951,708 and U.S. application Ser. No. 14/643,180 filed Mar. 10, 2015, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A quantum processor, comprising:
a flux qubit;
a first coupler inductively coupled to the flux qubit;
a compensator circuit inductively coupled to the first coupler, the compensator circuit operable to compensate at least in part for a magnetic susceptibility of the flux qubit; and
wherein the compensator circuit comprises a loop of superconducting material that superconducts below a critical temperature.

2. The quantum processor of claim 1, further comprising: a tunable inductance interrupting the loop of superconducting material.

3. The quantum processor of claim 2, wherein the tunable inductance comprises a compound Josephson junction.

4. The quantum processor of claim 3, wherein the tunable inductance comprises a plurality of compound Josephson junctions.

5. The quantum processor of claim 1, wherein a magnetic susceptibility of the compensator circuit is opposite to a magnetic susceptibility of the flux qubit.

6. The quantum processor of claim 1, further comprising a second coupler inductively coupled to the flux qubit, wherein the compensator circuit is inductively coupled to the first coupler and the second coupler.

7. The quantum processor of claim 6, further comprising a third coupler inductively coupled to the flux qubit.

8. The quantum processor of claim 7, further comprising a fourth coupler inductively coupled to the flux qubit.

9. The quantum processor of claim 6, further comprising a global signal line inductively coupled to the flux qubit and the compensator circuit, wherein at least one of the first coupler and the second coupler couples the flux qubit to one or more additional flux qubits, and wherein each of the flux qubit and the one or more additional flux qubits are coupled to the global signal line.

10. The quantum processor of claim 9, wherein each of the first coupler and the second coupler provides controllable communicative coupling between the flux qubit and one of the one or more additional flux qubits and the global signal line.

11. The quantum processor of claim 1, further comprising a flux source coupled to the flux qubit to effect changes in a qubit bias and a tunneling rate.

12. The quantum processor of claim 1, wherein the flux qubit comprises a first loop of superconducting material that superconducts below a critical temperature and a first compound Josephson junction interrupting the first loop of superconducting material.

13. The quantum processor of claim 12, wherein the first compound Josephson junction comprises two superconducting parallel paths, each superconducting parallel path interrupted by at least one Josephson junction.

14. The quantum processor of claim 1, further comprising a global signal line inductively coupled to the flux qubit and the compensator circuit.

15. The quantum processor of claim 14, wherein the global signal line includes a persistent current compensation line.

16. The quantum processor of claim 14, wherein the global signal line includes an annealing signal line that carries an annealing signal to evolve the quantum processor during quantum annealing computation.

17. The quantum processor of claim 14, wherein a first product of the coupling of the global signal line to the compensator circuit and a magnetic susceptibility of the compensator circuit has an equal magnitude and an opposite sign to a second product of the coupling of the global signal line to the flux qubit and the magnetic susceptibility of the flux qubit.

18. A quantum processor, comprising:
a flux qubit;
a first coupler inductively coupled to the flux qubit;
a compensator circuit inductively coupled to the first coupler, the compensator circuit operable to compensate at least in part for a magnetic susceptibility of the flux qubit; and wherein a magnetic susceptibility of the compensator circuit is opposite to a magnetic susceptibility of the flux qubit.

19. A quantum processor, comprising:
a flux qubit;
a first coupler inductively coupled to the flux qubit;
a compensator circuit inductively coupled to the first coupler, the compensator circuit operable to compensate at least in part for a magnetic susceptibility of the flux qubit; and
a global signal line inductively coupled to the flux qubit and the compensator circuit.

20. The quantum processor of claim 19, wherein the global signal line includes a persistent current compensation line.

21. The quantum processor of claim 19, wherein the global signal line includes an annealing signal line that carries an annealing signal to evolve the quantum processor during quantum annealing computation.

22. The quantum processor of claim 19, wherein a first product of the coupling of the global signal line to the compensator circuit and a magnetic susceptibility of the compensator circuit has an equal magnitude and an opposite sign to a second product of the coupling of the global signal line to the flux qubit and the magnetic susceptibility of the flux qubit.

* * * * *

UNITED STATES PATENT AND TRADEMARK OFFICE
CERTIFICATE OF CORRECTION

PATENT NO. : 11,423,115 B2
APPLICATION NO. : 17/007395
DATED : August 23, 2022
INVENTOR(S) : Trevor Michael Lanting It is certified that error appears in the above-identified patent and that said Letters Patent is hereby corrected as shown below:

In the Specification

Column 2, Line 56:
"$H_E \partial A(t)H_D + B(t)H_P$" should read, -- $H_E \propto A(t)H_D + B(t)H_P$ --.

Column 10, Line 43:
"$H_E \partial A(t)H_D + B(t)H_P$" should read, -- $H_E \propto A(t)H_D + B(t)H_P$ --.

Column 14, Line 19:
"$M_{AFM}\chi_q J_{ij} J_{jk} \sigma_i^z \otimes \alpha_k^z$" should read, -- $M_{AFM}\chi_q J_{ij} J_{jk} \sigma_i^z \otimes \sigma_k^z$ --.

Column 16, Line 28:
"$J_{ij} = I_p{}^i I_p{}^j M_i M_j \chi_{co}$" should read, -- $J_{ij} = I_p^i I_p^j M_i M_j \chi_{co}$ --.

Signed and Sealed this
Twenty-eighth Day of February, 2023

Katherine Kelly Vidal
*Director of the United States Patent and Trademark Office*